(12) United States Patent
Ramorini et al.

(10) Patent No.: US 9,263,942 B2
(45) Date of Patent: *Feb. 16, 2016

(54) LOW-CONSUMPTION AND HIGH-EFFICIENCY ENERGY-SCAVENGING INTERFACE, METHOD FOR OPERATING THE ENERGY-SCAVENGING INTERFACE, AND SYSTEM COMPRISING THE ENERGY-SCAVENGING INTERFACE

(71) Applicant: STMicroelectronics S.r.l., Agrate Brianza (IT)

(72) Inventors: Stefano Ramorini, Arluno (IT); Alessandro Gasparini, Cusano Milanino (IT); Alberto Cattani, Cislago (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 66 days.

This patent is subject to a terminal disclaimer.

(21) Appl. No.: 14/036,458

(22) Filed: Sep. 25, 2013

(65) Prior Publication Data

US 2014/0084900 A1    Mar. 27, 2014

(30) Foreign Application Priority Data

Sep. 27, 2012   (IT) .............................. TO2012A0846

(51) Int. Cl.
*H02M 3/155*   (2006.01)
*H02M 7/06*    (2006.01)
*H02M 1/32*    (2007.01)
(Continued)

(52) U.S. Cl.
CPC ................. *H02M 3/155* (2013.01); *F03G 5/06* (2013.01); *H02M 3/158* (2013.01); *H01F 27/40* (2013.01); *H02M 1/32* (2013.01); *H02M 1/4208* (2013.01); *H02M 7/06* (2013.01); *H02M 7/068* (2013.01); *H02M 7/217* (2013.01); *Y02B 70/126* (2013.01)

(58) Field of Classification Search
CPC ..... H02M 7/217; H02M 7/2173; H02M 7/23; H02M 7/25; H02M 11/00; H02M 2001/0074
USPC .......................................... 363/127; 323/222
See application file for complete search history.

(56) References Cited

U.S. PATENT DOCUMENTS 5,923,154 A    7/1999  Moller
6,229,292 B1   5/2001  Redl et al.
(Continued)

OTHER PUBLICATIONS

Italian Search Report and Written Opinion for TO2012A000846 mailed Jun. 13, 2013 (10 pages).
Dwari Suman, et al: "An Efficient AC-DC Step-Up Converter for Low-Voltage Energy Harvesting," IEEE Transactions on Power Electronics, vol. 25, No. 8, Aug. 2010 (pp. 2188-2199).
Cao Xinping et al: "Electromagnetic Energy Harvesting Circuit With Feedforward and Feedback DC-DC PWM Boost Converter for Vibration Power Generator System," IEEE Transactions on Power Electronics, vol. 22, No. 2, Mar. 2007 (pp. 679-685).
(Continued)

*Primary Examiner* — Timothy J Dole
*Assistant Examiner* — Bryan R Perez
(74) *Attorney, Agent, or Firm* — Gardere Wynne Sewell LLP

(57) ABSTRACT

An energy-scavenging interface receives an input signal from a transducer and supplies an output signal to a load. A switch is connected between the transducer and a reference node, and a diode is connected between the transducer and the load. A control circuit closes the switch for a time interval to permit energy storage in the transducer. A scale copy of a peak value of stored electric current is obtained. The switch is opened when the time interval elapses and the stored energy exceeds a threshold. The stored energy is then released to supply the load through the diode. The switch remains open as long as the value of current in the output signal exceeds the value of the scaled copy of the peak value.

30 Claims, 15 Drawing Sheets

(51) Int. Cl.
*H02M 1/42* (2007.01)
*H02M 3/158* (2006.01)
*H02M 7/217* (2006.01)
*F03G 5/06* (2006.01)
*H01F 27/40* (2006.01)

(56) References Cited

U.S. PATENT DOCUMENTS

| | | | |
|---|---|---|---|
| 6,504,208 B2* | 1/2003 | Bosco et al. | 257/341 |
| 6,995,496 B1 | 2/2006 | Hagood, IV et al. | |
| 7,466,112 B2 | 12/2008 | Zhou et al. | |
| 7,773,399 B2* | 8/2010 | Nakamura et al. | 363/127 |
| 7,800,928 B1 | 9/2010 | Dernovsek et al. | |
| 7,915,871 B2* | 3/2011 | Wang et al. | 323/222 |
| 8,159,204 B2 | 4/2012 | Grant | |
| 2005/0110277 A1 | 5/2005 | Adamson et al. | |
| 2006/0237968 A1 | 10/2006 | Chandrasekaran | |
| 2008/0290846 A1* | 11/2008 | Kanouda et al. | 323/222 |
| 2009/0284886 A1 | 11/2009 | Matsumoto | |
| 2009/0309566 A1* | 12/2009 | Shiu | 323/283 |
| 2010/0084920 A1 | 4/2010 | Banting et al. | |
| 2010/0165686 A1* | 7/2010 | Matzberger et al. | 363/127 |
| 2011/0096578 A1* | 4/2011 | Fang et al. | 363/127 |
| 2011/0221416 A1 | 9/2011 | Ivanov et al. | |
| 2011/0285131 A1 | 11/2011 | Kwon et al. | |
| 2012/0169064 A1 | 7/2012 | Hoffman et al. | |
| 2012/0224398 A1 | 9/2012 | Franco et al. | |

OTHER PUBLICATIONS

Hasan, A., et al.: "Monolithic DC-DC Boost Converter With Current-Mode Hysteretic Control," Electrical and Computer Engineering (CCECE), 2011 24th Canadian Conference on, IEEE, May 8, 2011, pp. 1242-1245.

Salmon, J. C. Ed—Institute of Electrical and Electronics Engineers: "Circuit Topologies for Single-Phase Voltage-Doubler Boost Rectifiers," IEEE, US, Feb. 23, 1992, pp. 549-556.

Shenck N. S., et al: "Energy Scavenging With Shoe-Mounted Piezoelectrics," IEEE Micro, IEEE Service Center, Los Alamitos, CA, US, vol. 21, No. 3, May 1, 2001 (9 pages).

\* cited by examiner

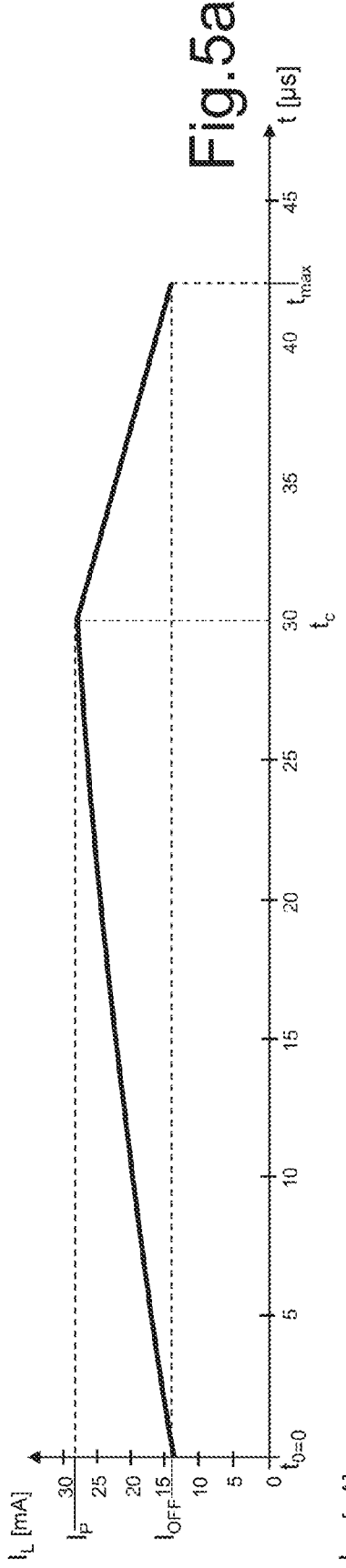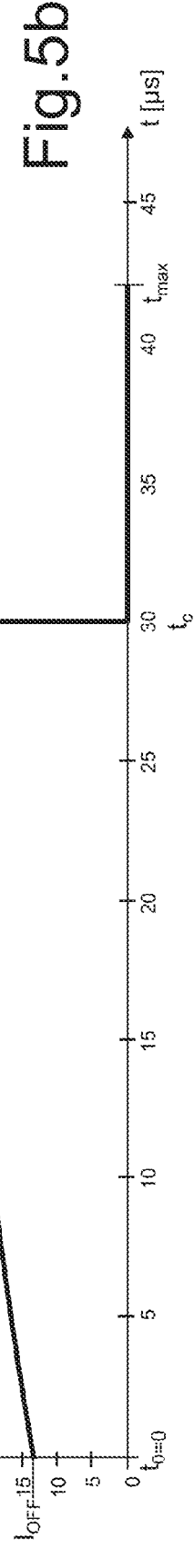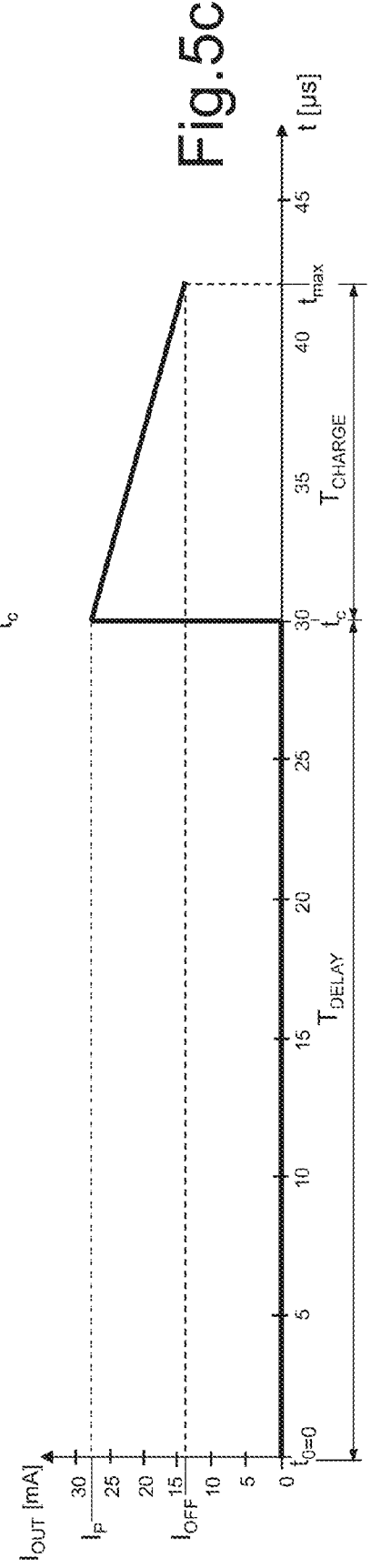

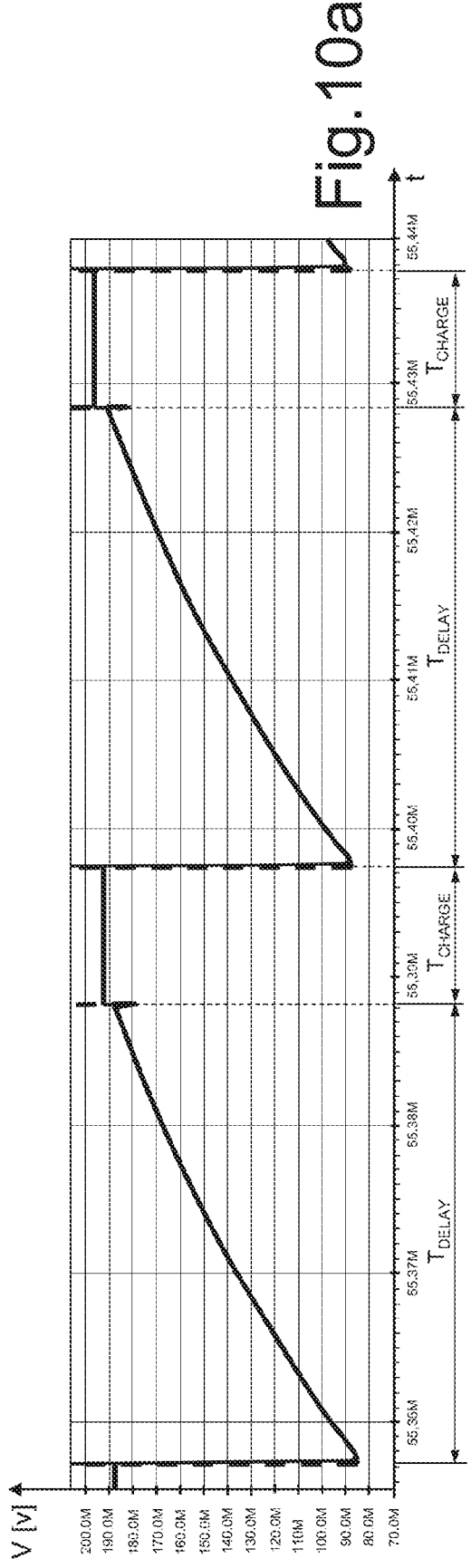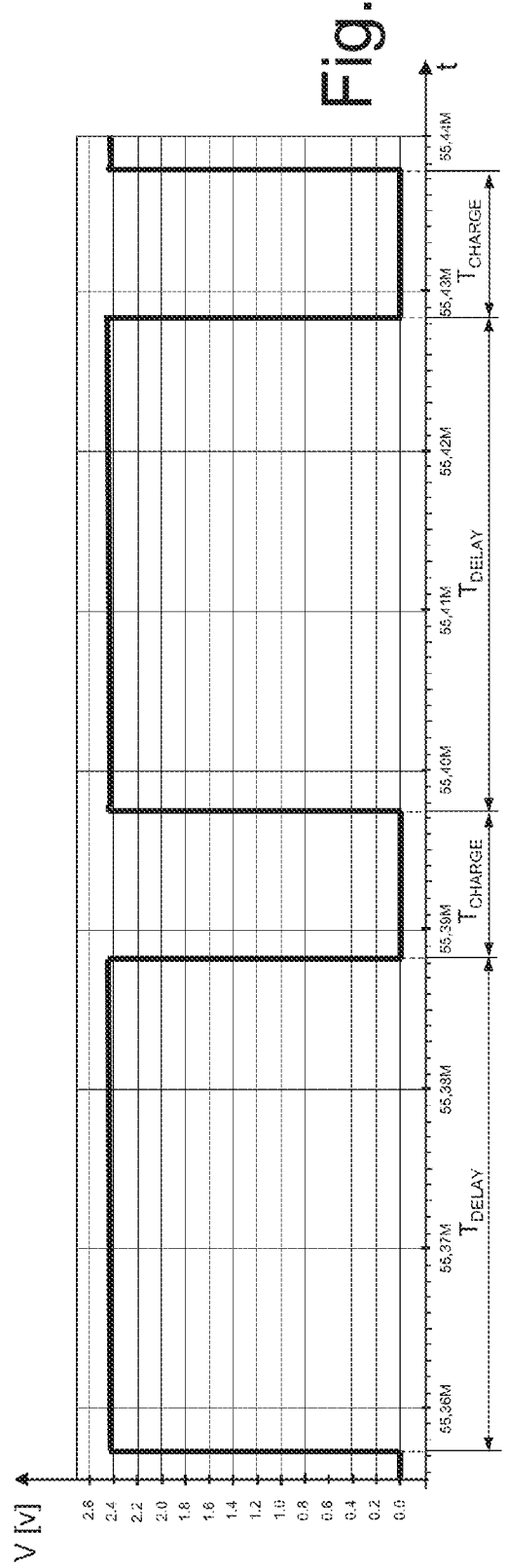

LOW-CONSUMPTION AND HIGH-EFFICIENCY ENERGY-SCAVENGING INTERFACE, METHOD FOR OPERATING THE ENERGY-SCAVENGING INTERFACE, AND SYSTEM COMPRISING THE ENERGY-SCAVENGING INTERFACE

PRIORITY CLAIM

This application claims priority from Italian Application for Patent No. TO2012A000846 filed Sep. 27, 2012, the disclosure of which is incorporated by reference.

TECHNICAL FIELD

The present invention relates to an energy-scavenging interface, to a method for operating the energy-scavenging interface, and to an environmental-energy-scavenging system comprising the energy-scavenging interface. The present invention moreover regards a system or apparatus (for example, a vehicle or an item of sports footwear) comprising the environmental-energy-scavenging system. In particular, the energy-scavenging interface comprises a rectifier circuit.

BACKGROUND

As is known, systems for energy scavenging or energy harvesting from intermittent environmental energy sources (which supply, that is, energy in an irregular way) arouse and continue to arouse considerable interest in a wide range of fields of technology. Typically, energy-scavenging systems are configured to harvest, store, and transfer energy generated by mechanical sources to a generic load of an electrical type.

Low-frequency vibrations, such as, for example, mechanical vibrations of disturbance in systems with moving parts, may be a valid source of energy. The mechanical energy is converted by one or more purposely provided transducers (for example, piezoelectric or electromagnetic devices) into electrical energy, which can be used for supplying an electrical load. In this way, the electrical load does not require batteries or other supply systems that are cumbersome and have a poor resistance to mechanical stresses.

FIG. 1 is a schematic illustration by means of functional blocks of an energy-scavenging system of a known type.

The energy-scavenging system 1 of FIG. 1 comprises: a transducer 2, for example of an electromagnetic type, configured to convert the mechanical energy of the environmental mechanical vibrations into electrical energy, for example into AC voltages or voltages randomly variable in time; a scavenging interface 4, for example comprising a diode-bridge rectifier circuit (also known as Graetz bridge), configured for receiving at input the AC signal generated by the transducer 2 and for supplying at output a DC signal, or in general a slowly variable signal that can be considered as a DC signal, for charging a capacitor 5 connected on the output of the rectifier circuit 4; and a DC-DC converter 6, connected to the capacitor 5 to receive at input the electrical energy stored by the capacitor 5 and supply it to an electrical load 8. The capacitor 5 functions as an element for storage of energy, which is made available, when required, to the electrical load 8 for operation of the latter.

The global efficiency $\eta_{TOT}$ of the energy-scavenging system 1 is given by $$\eta_{TOT} = \eta_{TRANSD} \cdot \eta_{SCAV} \cdot \eta_{DCDC} \qquad (1)$$

where: $\eta_{TRANSD}$ is the efficiency of the transducer 2, indicating the amount of power available in the environment that is effectively converted, by the transducer 2, into electric power; is the efficiency of the scavenging interface 4, indicating the power dissipated by the scavenging interface 4 and the factor $\eta_{COUPLE}$ of impedance matching between the transducer 2 and the scavenging interface 4; and $\eta_{DCDC}$ is the efficiency of the DC-DC converter 6.

As is known, in order to supply to the load the maximum power available, the impedance of the load should be the same as that of the source. As shown in FIG. 2, the transducer can be represented schematically, in this context, as a voltage generator 3 provided with a resistance $R_S$ of its own. The maximum power $P_{TRANSD}^{MAX}$ that the transducer 2 can supply at output can be defined as $$P_{TRANSD}^{MAX} = V_{TRANSD}^2 / 4R_S \text{ if } R_{LOAD} = R_S \qquad (2)$$

where: $V_{TRANSD}$ is the voltage supplied by the equivalent voltage generator; and $R_{LOAD}$ is the equivalent electrical resistance on the output of the transducer 2 (or, likewise, the resistance seen at input to the scavenging interface 4), which takes into due account the equivalent resistance of the scavenging interface 4, of the DC-DC converter 6, and of the load 8.

On account of the impedance mismatch ($R_{LOAD} \neq R_S$), the power at input to the scavenging interface 4 is lower than the maximum power available $P_{TRANSD}^{MAX}$.

The power $P_{SCAV}$ transferred on the capacitor 5 is a fraction of the power recovered by the interface, and is given by $$P_{SCAV} = \eta_{TRANSD} \cdot \eta_{SCAV} \cdot P_{TRANSD}^{MAX} \qquad (3)$$

The power required of the DC-DC converter 6 for supplying the electrical load 8 is given by $$P_{LOAD} = P_{DCDC} \cdot \eta_{DCDC} \qquad (4)$$

where $P_{DCDC}$ is the power received at input by the DC-DC converter 8, in this case coinciding with $P_{SCAV}$, and $P_{LOAD}$ is the power required by the electrical load.

The efficiency of the system 1 of FIG. 1 is markedly dependent upon the signal generated by the transducer 2. The efficiency drops rapidly to the zero value (i.e., the system 1 is unable to harvest environmental energy) if the amplitude of the signal of the transducer (signal $V_{TRANSD}$) assumes a value lower, in absolute value, than $V_{OUT} + 2V_{TH\_D}$, where $V_{OUT}$ is the voltage stored on the capacitor 5 and $V_{TH\_D}$ is the threshold voltage of the diodes that form the scavenging interface 4. As a consequence of this, the maximum energy that can be stored in the capacitor 5 is limited to the value $E_{max} = 0.5 \cdot C_{OUT} \cdot (V_{TRANSD}^{MAX} - 2V_{TH\_D})^2$. If the amplitude of the signal $V_{TRANSD}$ of the transducer 2 is lower than twice the threshold voltage $V_{TH\_D}$ of the diodes of the rectifier of the scavenging interface 4 (i.e., $V_{TRANSD} < 2V_{TH\_D}$), no energy is harvested from the environment, and the load is not supplied.

SUMMARY

There is a need in the art to provide a rectifier circuit, a method for operating the rectifier circuit, an environmental-energy-scavenging system comprising the rectifier circuit, and an apparatus comprising the environmental-energy-scavenging system that addresses the aforementioned problems and disadvantages, and in particular that will present a high efficiency.

According to one embodiment, the energy-scavenging interface comprises an input port that can be connected to a transducer to receive an input signal, and an output port that can be connected to an electrical load to supply an output signal to the electrical load. The energy-scavenging interface comprises: a switch connected to the input port; a diode with in series a resistor, connected between the input port and the electrical load; and a control logic configured for: closing the switch for a time interval in which the storage element stores electrical energy; acquiring a scaled copy of a peak value of the electric current stored; opening, once the first time interval has elapsed, the switch so as to supply the electrical load through the diode using the electric charge stored in the storage element; keeping the switch in the open state as long as the value in current of the output signal is higher than the value of the scaled copy of the peak value.

BRIEF DESCRIPTION OF THE DRAWINGS

For a better understanding of the present invention, preferred embodiments thereof are now described, purely by way of non-limiting example and with reference to the attached drawings, wherein:

FIG. 3b shows an implementation of the energy-scavenging system of FIG. 3a;

FIGS. 5a-5c show the time plot of current signals of the energy-scavenging system of FIG. 3a or FIG. 3b in the operating conditions of FIGS. 4a and 4b;

FIGS. 10a and 10b illustrate, using one and the same time scale, the time plot of current signals in the circuit of FIG. 8, in particular for showing a step of passage between the operating condition of FIG. 4a and the operating condition of FIG. 4b;

DETAILED DESCRIPTION OF THE DRAWINGS

An energy-scavenging interface (in particular, having the configuration of a rectifier circuit) can be connected between an input signal source (in particular, an AC voltage signal) and an electrical load to be supplied (possibly by interposition of a DC-DC converter for supplying the load at an adequate voltage level).

The energy-scavenging interface comprises, according to an embodiment, a first switch and a second switch, which each have a control terminal. In particular, the first switch is connected between a first input terminal of the energy-scavenging interface and a reference-voltage terminal, whilst the second switch is connected between a second input terminal of the energy-scavenging interface and the reference-voltage terminal. The energy-scavenging interface further comprises a control logic, coupled to the control terminals of the first and second switches, configured for opening/closing the first and second switches by means of an appropriate control signal.

The energy-scavenging interface further comprises two diodes with a respective resistor connected in series. One diode-resistor series is connected between the first input terminal and an output terminal of the energy-scavenging interface, coupled to an electrical load; the other diode-resistor series is connected between the second input terminal and the output terminal of the energy-scavenging interface.

The resistors connected in series to each diode can be provided in any way, for example by means of passive resistive electrical elements, or using active elements, for example MOSFETs or bipolar transistors, etc.

The first and second switches are, for example, n-channel MOSFETs, which have an internal diode (parasitic diode). The diodes are, for example, also n-channel MOSFETs operated in a passive way, i.e., exploiting only the parasitic diode internal to the MOSFET. Alternatively, the first and second switches are formed with a technology different from the aforementioned one; they may, for example, be p-channel MOSFETs, or NPN or PNP bipolar transistors, IGBTs, or others still. Likewise, also the aforementioned diodes can be formed with a technology different from MOSFET technology; for example, they may be p-n junction diodes.

As has been said, present on the output of the energy-scavenging interface is an electrical load, in particular a capacitor configured to store the power transferred at output from the scavenging interface 4. In parallel to the capacitor there may be present an electrical load, which is supplied by means of the energy stored in the capacitor. As has already been said, between the capacitor and the electrical load there may be set a DC-DC converter, of a buck, boost, or buck/boost type.

The energy-scavenging interface is described in detail with reference to a preferred application thereof, in particular as rectifier circuit of an energy-scavenging system set between an AC voltage source and a storage element and/or electrical load.

Figure 1:
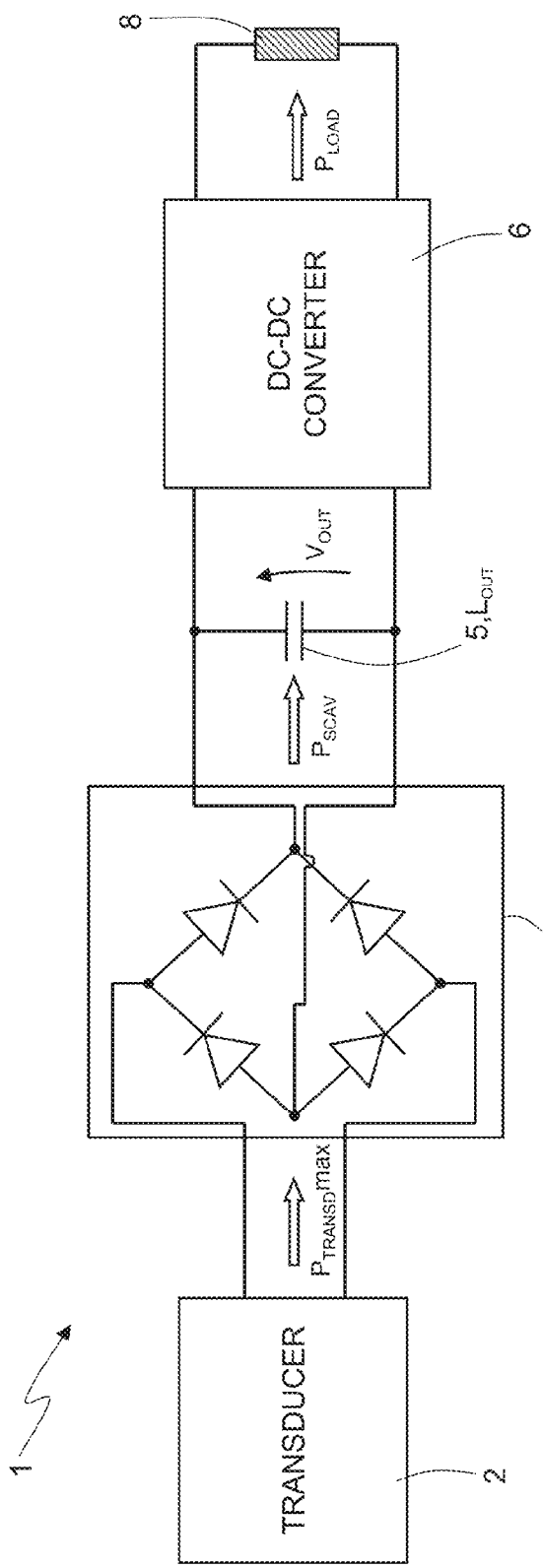
FIG. 1 shows an energy-scavenging system according to a known embodiment.
Figure 2:
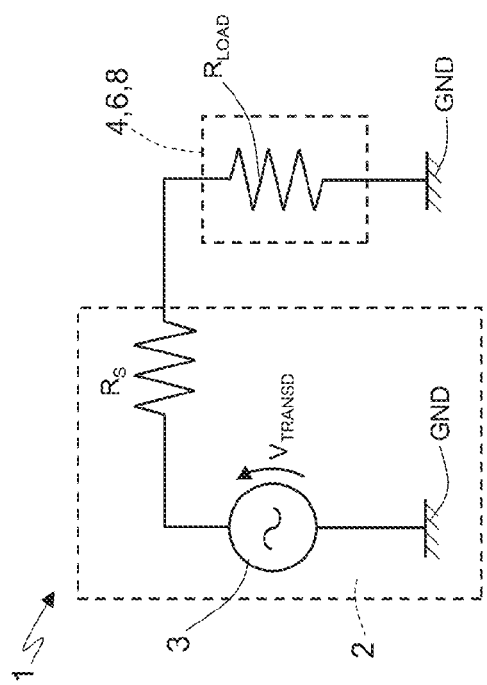
FIG. 2 shows an energy-scavenging system according to a further known embodiment.
Figure 3A:
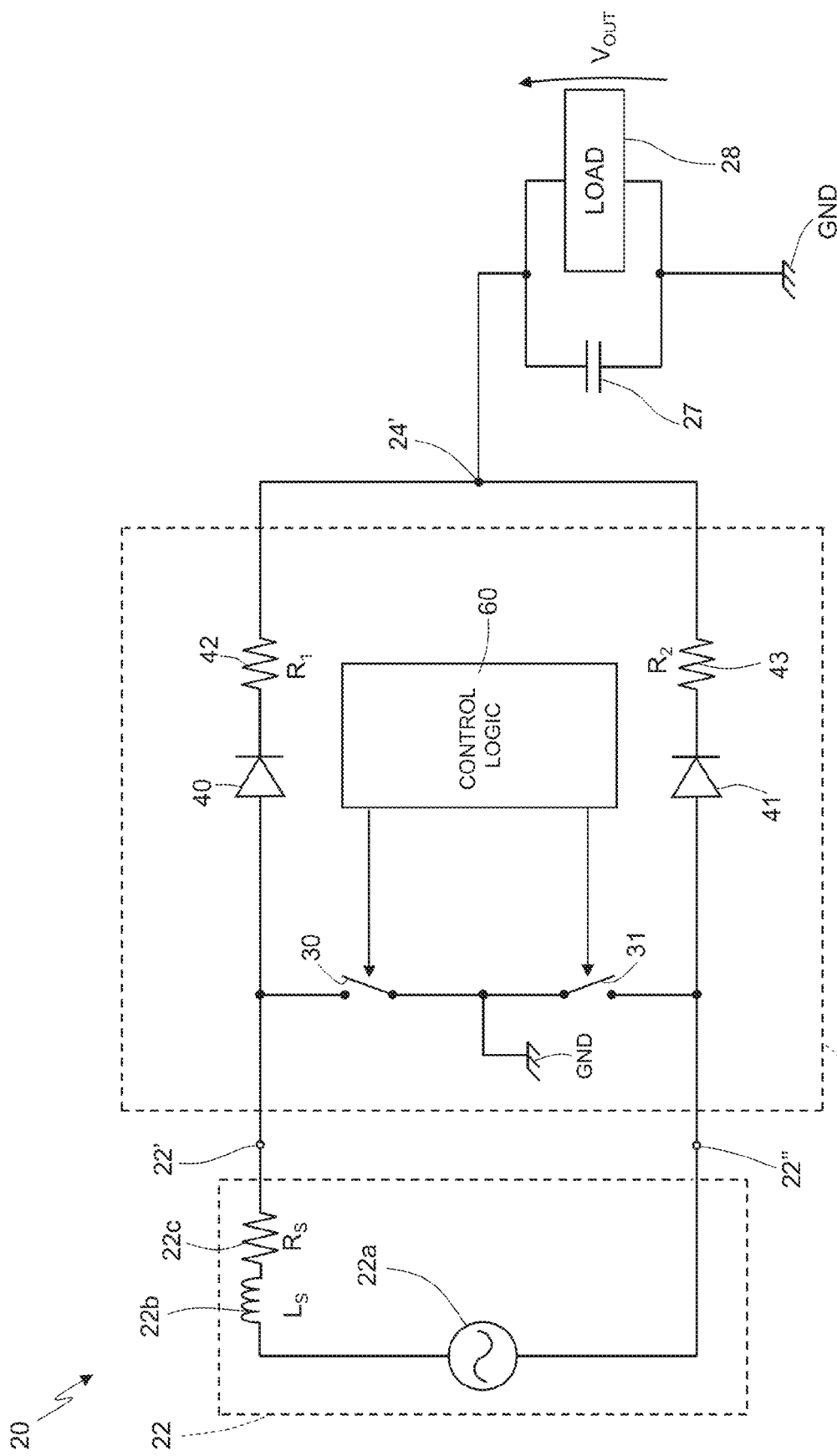
FIG. 3a shows an energy-scavenging system comprising an energy-scavenging interface that can be operated according to the steps of the method of FIG. 13.

FIG. 3a shows an energy-scavenging system 20 comprising a rectifier circuit 24 (as has been said, having the function of energy-scavenging interface), according to one embodiment.

In general, the energy-scavenging system 20 comprises: a transducer 22 including output terminals 22', 22" of its own; the rectifier circuit 24, including a first input terminal and a second input terminal coinciding, from an electrical standpoint, with the output terminals 22', 22" of the transducer 22, and an output terminal 24'; and a storage element 27, for example a capacitor, connected between the output terminal 24' of the rectifier circuit 24 and a reference-voltage terminal GND, and configured for storing electric charge supplied at output from the rectifier circuit 24. The reference-voltage terminal GND is, in particular, a ground voltage, for example equal to approximately 0 V. Other reference voltages may, however, be used.

The transducer 22 is, for example, an electromagnetic transducer, and is represented schematically so as to include a voltage generator 22a, configured to supply a voltage $V_{TRANSD}$, an inductor 22b (typical of the electromagnetic transducer) having a value of inductance $L_S$, and a resistor 22c having a value of resistance $R_S$ and connected in series to the inductor 22b.

On the output of the rectifier circuit 24, in parallel to the storage element 27, there may be connected an electrical load 28, configured to be supplied by the charge stored in the storage element 27, or a DC-DC converter in the case where the electrical load requires a voltage value different from the one generated at output by the rectifier circuit 24.

Connected between the first input terminal 22' and the reference-voltage terminal GND is a first switch 30, in particular of a voltage-controlled type. The first switch 30 is, for example according to an embodiment shown in FIG. 3b, a MOSFET of an n type. Connected between the second input terminal 22" and the reference-voltage terminal GND is a second switch 31, in particular of a voltage-controlled type. Also the second switch 31 is, according to the embodiment of FIG. 3b, a MOSFET of an n type.

For simplicity of description, in what follows the first and second switches 30, 31 will be referred to, respectively, as "first and second transistors" 30, 31, without this implying any loss of generality.

Likewise, by "transistor closed" or "transistor turned on" will be meant in what follows a transistor biased in such a way as to enable conduction of electric current between its source and drain terminals, i.e., configured for behaving as a closed switch, and by "transistor open" or "transistor turned off" will be meant in what follows a transistor biased in such a way as not to enable conduction of electric current between its source and drain terminals, i.e., configured for behaving as an open switch.

Figure 3B:
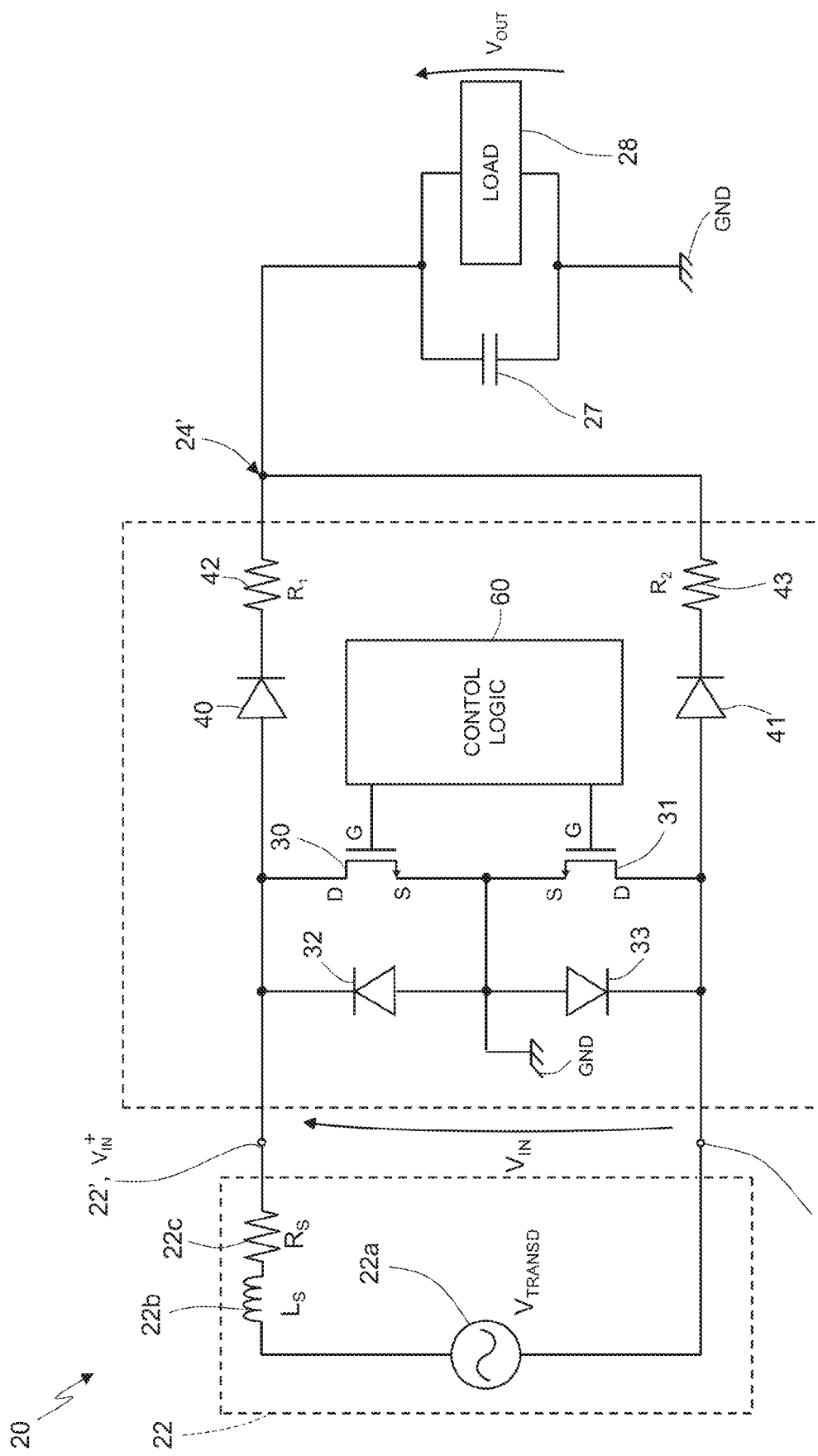

With reference to FIG. 3b, between a source terminal S and a drain terminal D of the first transistor 30, a first intrinsic (parasitic) diode 32 is represented, in a configuration known as "antiparallel" (with respect to the normal direction of flow of the current through the first transistor 30). As is known, a characteristic of a MOSFET is that of presenting, in certain operating conditions, the electrical properties of a diode (parasitic diode). Said diode is electrically set (integrated) between the source and drain terminals of the MOSFET. In other words, the first transistor 30 can present the electrical behavior of a diode, where the cathode of the diode corresponds to the drain terminal and the anode to the source terminal of the first transistor 30 (or vice versa, in the case of MOSFETs of a p type). The first intrinsic diode 32 is hence the diode integrated in the first transistor 30.

Likewise, a second intrinsic (parasitic) diode 33 is represented connected in antiparallel configuration between the source terminal S and the drain terminal D of the second transistor 31; also in this case, the second intrinsic diode 33 is the diode integrated in the second transistor 31.

In greater detail, the drain terminal D of the first transistor 30 is connected to the first input terminal 22' of the rectifier circuit 24, and the source terminal S of the first transistor 30 is connected to the reference-voltage terminal GND. The drain terminal D of the second transistor 31 is connected to the second input terminal 22" of the rectifier circuit 24, and the source terminal S of the second transistor 31 is connected to the reference-voltage terminal GND.

With reference to both of FIGS. 3a and 3b, the rectifier circuit 24 further comprises a first transfer diode 40 and a second transfer diode 41. The first transfer diode has its anode terminal connected to the first input terminal 22' and its cathode terminal connected, via a resistor 42 (having resistance $R_1$) to the output terminal 24' of the rectifier circuit 24.

The second transfer diode 41 has its anode terminal connected to the second input terminal 22" and its cathode terminal connected to the output terminal 24' of the rectifier circuit 24 via a resistor 43 (having resistance $R_2$).

The value of resistance of the resistors 42, 43 is a function of the current that flows in the inductor 22b, hence a function of the electrical parameters of the electromagnetic transducer 22. The function of these resistors is to enable a detection of current (as illustrated more fully in what follows).

During the positive half-cycles of the voltage of the transducer $V_{TRANSD}$ (i.e., the positive half-cycles of the input voltage $V_{IN}$), the voltage rectification is carried out by means of the first transistor 30 and the first transfer diode 40. Conversely, during the negative half-cycles of the voltage of the transducer $V_{TRANSD}$ (i.e., the negative half-cycles of the input voltage $V_{IN}$), the voltage rectification is carried out by means of the second transistor 31 and the second transfer diode 41.

In particular, in the positive half-cycles of the input voltage $V_{IN}$, a control logic 60 keeps the second transistor 31 open and opens/closes the first transistor 30 according to a control method described in detail in what follows in order to transfer the energy stored in the inductor 22b to the capacitor 27 through the first transfer diode 40. Likewise, for negative polarities of the input signal $V_{IN}$, the first transistor 30 is kept closed whilst the second transistor 31 is opened/closed. In this case, the energy stored in the inductor 22b is transferred onto the capacitor 27 through the second transfer diode 41.

In brief, the aforementioned control method envisages that the first transistor 30 (second transistor 31) will be kept closed until a given time interval ($T_{DELAY}$) has elapsed and until a minimum threshold value $I_{TH}$ of the current that flows in the inductor 22b has been reached; when both of the conditions are met, the control logic 60 opens the first transistor 30 (second transistor 31), and the energy stored in the inductor 22b is transferred onto the capacitor 27 through the first transfer diode 40 (second transfer diode 41). Once a value of current in the inductor 22b equal to a minimum threshold (threshold $I_{OFF}$) has been reached, the control logic 60 recloses the first transistor 30 (second transistor 31), and the steps described restart cyclically.

Since the steps described for driving the first transistor 30 for positive polarity values of the input signal $V_{IN}$ are similar to the steps for driving the second transistor 31 for negative polarity values of the input signal $V_{IN}$, also the circuit structure of the rectifier 24, as may be noted in FIGS. 3a, 3b, is symmetrical.

In what follows, operation of the rectifier 24 is described in greater detail with reference to a circuit model valid for a single polarity (in particular, the positive polarity) of the input signal $V_{IN}$. What has been described can be, however, readily applied, in a symmetrical way, to operation for negative polarities of the input signal $V_{IN}$.

Figure 4A:
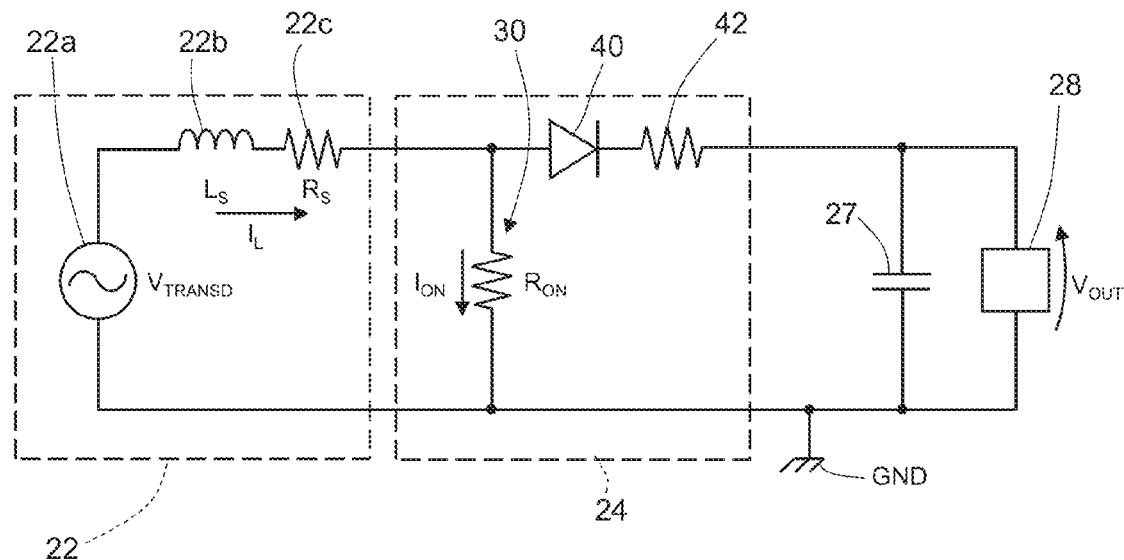
FIG. 4a shows the energy-scavenging system of FIG. 3a or FIG. 3b in a first operating condition of storage of electrical energy.

FIG. 4a shows a circuit equivalent to the circuit of FIGS. 3a, 3b for positive half-waves of the input voltage $V_{IN}$. The second transistor 31 is replaced by an (ideal) short circuit. In this situation, the first transistor 30 shows an on-state resistance equal to $R_{ON}$. The current $I_L$ that flows in the inductor 22b is equal to the current $I_{ON}$ that flows through the on-state resistance $R_{ON}$ of the first transistor 30.

The value of the current $I_L$ increases with a time constant $L_S/R_S$, until a steady-state value is reached $I_P \approx V_{TRANSD}/R_S$ (see the graph of FIG. 5a).

The curve of $I_L$ has a time evolution given by $$I_L = I_{ON} = \frac{V_{TRANSD}}{R_S}\left(1 - e^{-\frac{t}{\tau}}\right) - I_{OFF} \cdot e^{-\frac{t}{\tau}}$$

and the current $I_{ON}$ reaches the peak value $I_p$ at time $t = t_c = T_{DELAY}$. For simplicity, it is assumed that the starting instant $t_0$ is equal to zero.

Figure 4B:
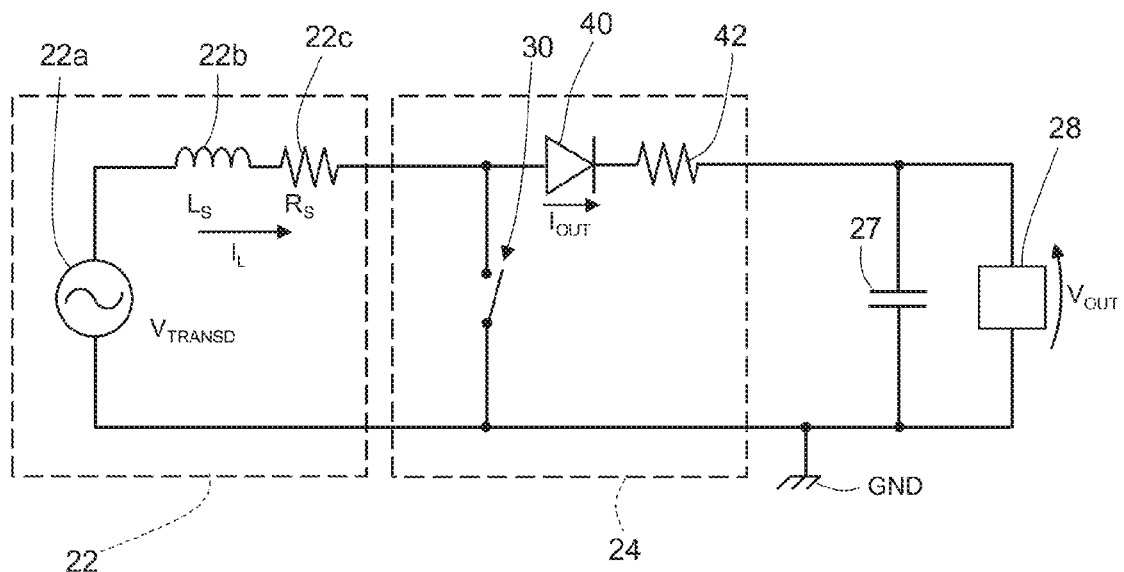
FIG. 4b shows the energy-scavenging system of FIG. 3a or FIG. 3b in a second operating condition of transfer of the electrical energy stored during the operating condition of FIG. 4a towards an electrical load.

Once the time interval $T_{DELAY}$ has elapsed, and since the current $I_L$ that flows in the inductor 22b has reached a value equal to, or higher than, the threshold value $I_{TH}$, there is a passage to the operating condition represented schematically in FIG. 4b.

The time interval $T_{DELAY}$ is the interval elapsing between the instant of closing of the first transistor 30 ($t_0$) and the instant of opening of the first transistor 30 ($t_c$). The value of threshold current $I_{TH}$ is chosen on the basis of the peak values of current $I_p$ that are reached according to the application of the rectifier circuit 24. These values depend upon the characteristics of the transducer 22 and upon the environmental stresses to which the transducer 22 is subjected. In particular, the value of threshold current $I_{TH}$ is chosen much lower than the peak value $I_p$ that is expected to be reached in the application in which the rectifier circuit 24 is used. For example, assuming that peak values $I_p$ of approximately 150 mA are reached, the threshold $I_{TH}$ can be chosen between approximately 5 and 10 mA. It is pointed out that the choice of a threshold current $I_{TH}$ too close to the peak value $I_p$ entails a low efficiency.

In fact, according to what has been described, current is transferred at output only when the threshold $I_{TH}$ is exceeded. All the portions of signal $V_{TRANSD}$ that generate a current with peak value $I_p < I_{TH}$ do not give contribution of charge transferred at output.

With reference to FIG. 4b, at the time $t_c$, the first transistor 30 is opened, and the current $I_L$ that flows in the inductor 22b is the current $I_{OUT}$ supplied at output by the rectifier 24. The current in the inductor 22b decreases with a constant slope, until the pre-defined value $I_{OFF}$ is reached at time $t_{max}$ (see again FIG. 5a), according to the relation $$\frac{dI_L}{dt} = \frac{V_{OUT} + V_{BE} + (R_1 + R_S) \cdot \frac{I_P + I_{OFF}}{2} - V_{TRANSD}}{L_S}$$

The value $I_{OFF}$ is given by $I_p/K$, with K constant (greater than 1) chosen as explained hereinafter, $R_S$ is the value of resistance of the resistor 22c, $R_1$ is the value of resistance of the resistor 42, $V_{BE}$ is the voltage drop on the diode 40 that is forward-biased.

From the formula for $I_{OFF}$ indicated previously, the following formula is obtained for $I_p$ $$I_P = \frac{V_{TRANSD}}{R_1 + R_S} \cdot \frac{\left(1 - e^{-\frac{T_{DELAY}}{\tau}}\right)}{1 - \frac{1}{K}e^{-\frac{T_{DELAY}}{\tau}}}$$

Hence, as has been said, the curve of the current $I_L$ reaches the maximum value $I_P$ at the instant in time $t_c$, in which the first transistor 30 is opened. Then, between $t_c$ and $t_{max}$ (time interval $T_{CHARGE}$) the current $I_L$ decreases to the value $I_{OFF} = I_p/K$.

FIG. 5b shows, using the same time scale as that of FIG. 5a, the plot of the current $I_{ON}$ that flows through the first transistor 30. In the time interval $t_0 - t_c$ the current $I_{ON}$ presents the same evolution as the current $I_L$ (we are, in fact, in the situation of FIG. 4a). At the instant $t_c$, the first transistor 30 is opened (FIG. 5b), and the current $I_{ON}$ drops to zero.

FIG. 5c shows, using the same time scale as that of FIGS. 5a and 5b, the plot of the output current $I_{OUT}$. The current $I_{OUT}$ remains at a zero value in the time interval $t_0 - t_c$, and then increases to the value $I_P$ at the instant $t_c$ (upon opening of the first transistor 30). Then, between $t_c$ and $t_{max}$ (time interval $T_{CHARGE}$) the output current $I_{OUT}$ coincides with the current $I_L$.

The time interval $T_{CHARGE}$ is given by $$T_{CHARGE} = L_S \cdot \frac{I_P - I_{OFF}}{V_{OUT} + V_{BE} + (R_1 + R_S) \cdot \frac{I_P + I_{OFF}}{2} - V_{TRANSD}}$$

At the time $t_{max}$, the first transistor 30 is closed again, and the inductor 22b charged, according to what has already been described. The steps of charging and discharging of the inductor 22b (and, consequently, of supply of the capacitor 27/load 28) are repeated cyclically.

The integral of the curve of $I_{OUT}$ (FIG. 5c) between the time $t_c$ and the time $t_{max}$ indicates the charge $Q_{CYCLE}$ transferred between the input and the output of the rectifier 24 in the time $T_{CHARGE}$. In order to maximize the efficiency of transfer of charge between the input and the output of the rectifier 24, the value of the power $P_{CYCLE}$ transferred at output in each cycle of charge/discharge of the inductor 22b should be maximized. The power is defined as $P_{CYCLE} = V_{OUT} \cdot I_{CYCLE}$, where $I_{CYCLE}$ is given by $I_{CYCLE} = Q_{CYCLE}/T_{CYCLE}$, where $T_{CYCLE}$ is the time interval elapsing between $t_0$ and $t_{max}$ ($T_{CYCLE} = T_{DELAY} + T_{CHARGE}$).

It is recognized that $P_{CYCLE}$ is given by the following relation (where $I_{ON}$ assumes the peak value $I_p$)

$$P_{CYCLE} = \frac{\frac{I_{ON} + I_{OFF} \cdot T_{CHARGE}}{2}}{T_{DELAY} + T_{CHARGE}} \cdot V_{OUT}$$

In addition, the time interval $T_{CHARGE}$ is given by the following relation $$T_{CHARGE} = L_S \cdot \frac{I_P - I_{OFF}}{V_{OUT} + V_{BE} + (R_1 + R_s) \cdot \frac{I_P + I_{OFF}}{2} - V_{TRANSD}}$$

From the foregoing relation it may be noted how the power $P_{CYCLE}$ is a function of the design parameters $T_{DELAY}$ and K, and of the external variables $V_{TRANSD}$ (voltage of the transducer, which is not predictable) and $V_{OUT}$ (voltage on the capacitor 27, which is not predictable either). Maximizing the value of $P_{CYCLE}$ hence means finding the optimal values of $T_{DELAY}$ and K in such a way that the curve of $P_{CYCLE}$ reaches a maximum value, or a value close to the maximum value, or an optimal value that can be defined according to the particular application and design requirements.

The curve of $P_{CYCLE}$ reaches an optimal value when the output of the transducer 22 and the input of the rectifier circuit 24 show the same impedance (namely, they are matched). The best matching efficiency $\eta_{COUPLE}$ between the transducer 22 and the rectifier circuit 24 is given by $P_{CYCLE}^{OPT}/P_{TRANSD}^{MAX}$, where $P_{CYCLE}^{OPT}$ is the value of $P_{CYCLE}$ calculated with optimal values of $T_{DELAY}$ and K, and $P_{TRANSD}^{MAX}$ is given by $(V_{TRANSD})^2/4R_S$.

Optimization of the value of $P_{CYCLE}$ enables an optimal value of the time interval $T_{DELAY}$ to be obtained (and vice versa) as a function of the value of $V_{TRANSD}$ and $V_{OUT}$.

However, the dependence of $T_{DELAY}$ upon $V_{TRANSD}$ and $V_{OUT}$ is irrelevant for practical purposes, and the value of matching efficiency $\eta_{COUPLE}$ reaches values higher than 85% for values of $V_{TRANSD}$ and $V_{OUT}$ of practical interest.

Figure 6:
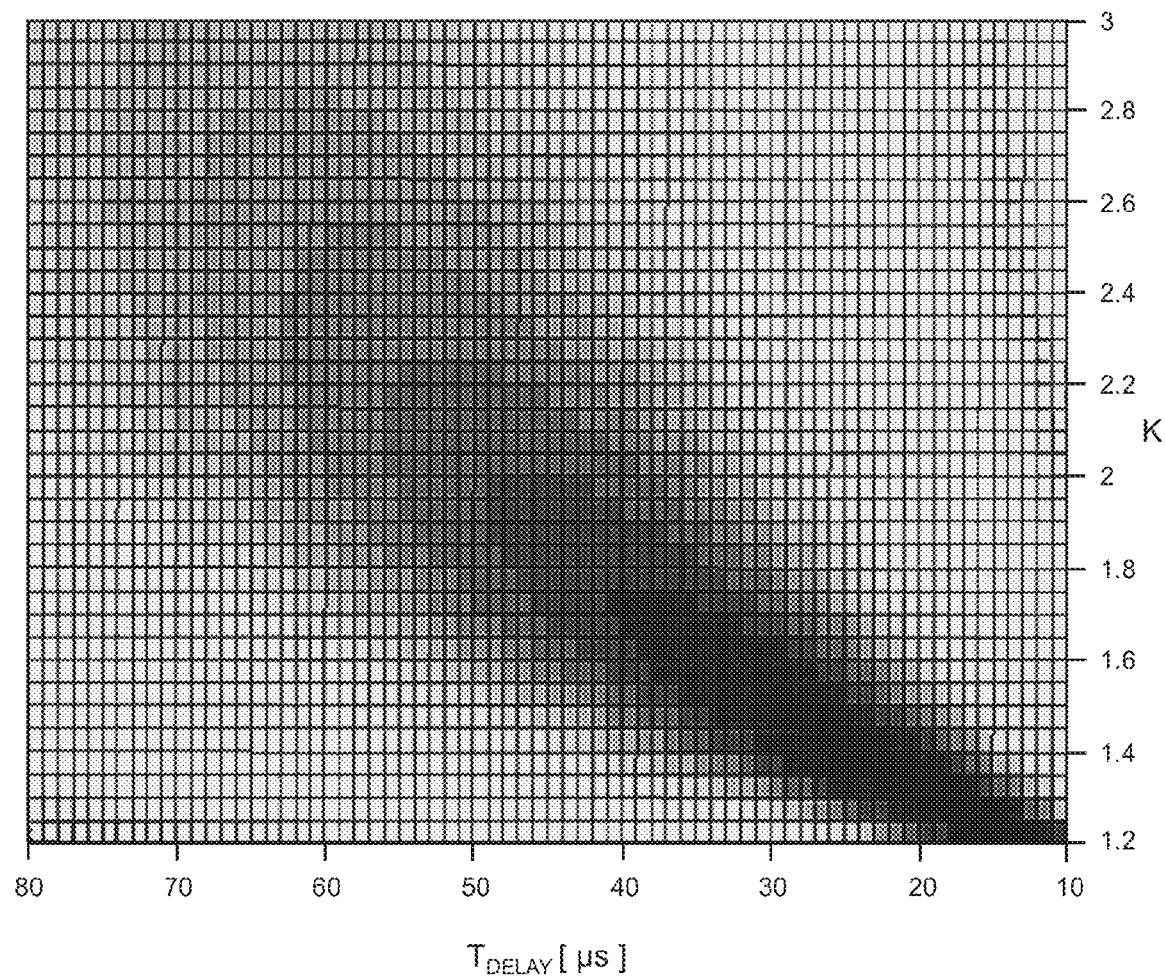
FIG. 6 shows the plot of the matching factor between the transducer and the scavenging-interface circuit of FIGS. 3a, 3b, as the operating parameters vary.

FIG. 6 shows the variation of the matching efficiency $\eta_{COUPLE}$ as the values $T_{DELAY}$ and K vary (for values of $V_{TRANSD}=1$ V and $V_{OUT}=5$ V).

The graph of FIG. 6 can be obtained easily starting from the expression of $P_{CYCLE}$ by varying the parameters $T_{DELAY}$ and K (fixing the values of the external variables $V_{TRANSD}$ and $V_{OUT}$). Corresponding to each value of $\eta_{COUPLE}$ is a pair of values $T_{DELAY}$ and K. It is thus possible to derive in an automatic way the pair of optimal values $T_{DELAY}$ and K to obtain a desired value of matching efficiency $\eta_{COUPLE}$.

In the graph of FIG. 6, the darker areas are those in which the value of matching efficiency $\eta_{COUPLE}$ is higher; conversely, the lighter areas are those in which the value of matching efficiency $\eta_{COUPLE}$ is lower (low values of $T_{DELAY}$ and high values of K, or high values of $T_{DELAY}$ and low values of K).

Figure 7:
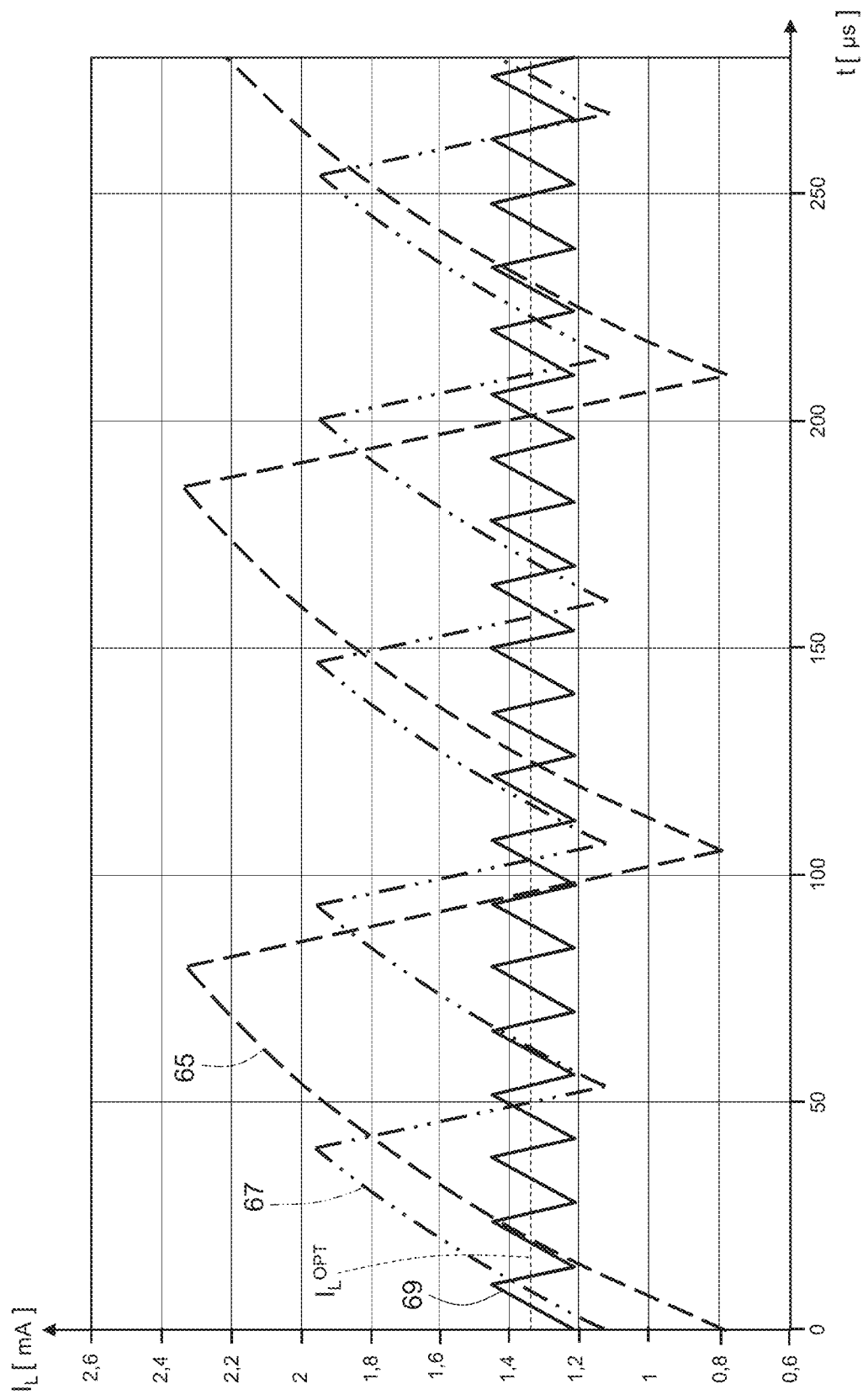
FIG. 7 shows profiles of storage/discharge of current in the energy-scavenging system in the operating conditions of FIGS. 4a and 4b.

FIG. 7 shows profiles of current $I_L$ in the inductor 22b as pairs of values of $T_{DELAY}$ and K vary.

In particular, the curve 65 shows the cyclic pattern, in time t (represented in µs), of the profile of current $I_L$ for high values of $T_{DELAY}$ and K (for example, $T_{DELAY}=80$ µs and K=3). In this case, there is the advantage that the frequency of opening/closing of the first transistor 30 (and of the second transistor 31) is low; this results in a reduced energy consumption by the rectifier circuit 24 during use. However, the values of peak current $I_p$ reached by the current $I_L$ according to the curve 65 are high, and the impedance matching between the transducer 22 and the rectifier circuit 24 is other than optimal, causing a relatively low matching efficiency $\eta_{COUPLE}$ ($\eta_{COUPLE}\approx81.2\%$).

The curve 67 shows the cyclic pattern, in time t (µs), of the profile of current $I_L$ for average values of $T_{DELAY}$ and K (for example, $T_{DELAY}=40$ µs and K=1.75). In this case, the frequency of opening/closing of the first transistor 30 (and of the second transistor 31) is higher than in the case of the curve 65, but there is the advantage that the values of peak current are lower than in the case of the curve 65, and the matching efficiency is higher than in the previous case ($\eta_{COUPLE}\approx85.5\%$).

Finally, the curve 69 shows the cyclic pattern, in time t (µs), of the profile of current $I_L$ for small values of $T_{DELAY}$ and K (for example, $T_{DELAY}=10$ µs and K=1.2). In this case, the matching efficiency $\eta_{COUPLE}$ is still higher than in the case of the curve 67 (approximately 87.5%), but with the disadvantage that the driving frequency of the first transistor 30 (and of the second transistor 31) is excessively high, causing an excessive consumption of current by the rectifier circuit 24, with consequent reduction of the efficiency factor $\eta_{SCAV}$ not sufficiently compensated for by the increase in the value of matching efficiency $\eta_{COUPLE}$.

For the purposes of application of the rectifier circuit 24 as energy-scavenging interface in an environmental-energy-scavenging system, a compromise choice, such as for example that of the curve 67, is preferable. It is evident that other contexts may lead to a different choice of the values of $T_{DELAY}$ and K (in general, with K≥1).

Figure 8:
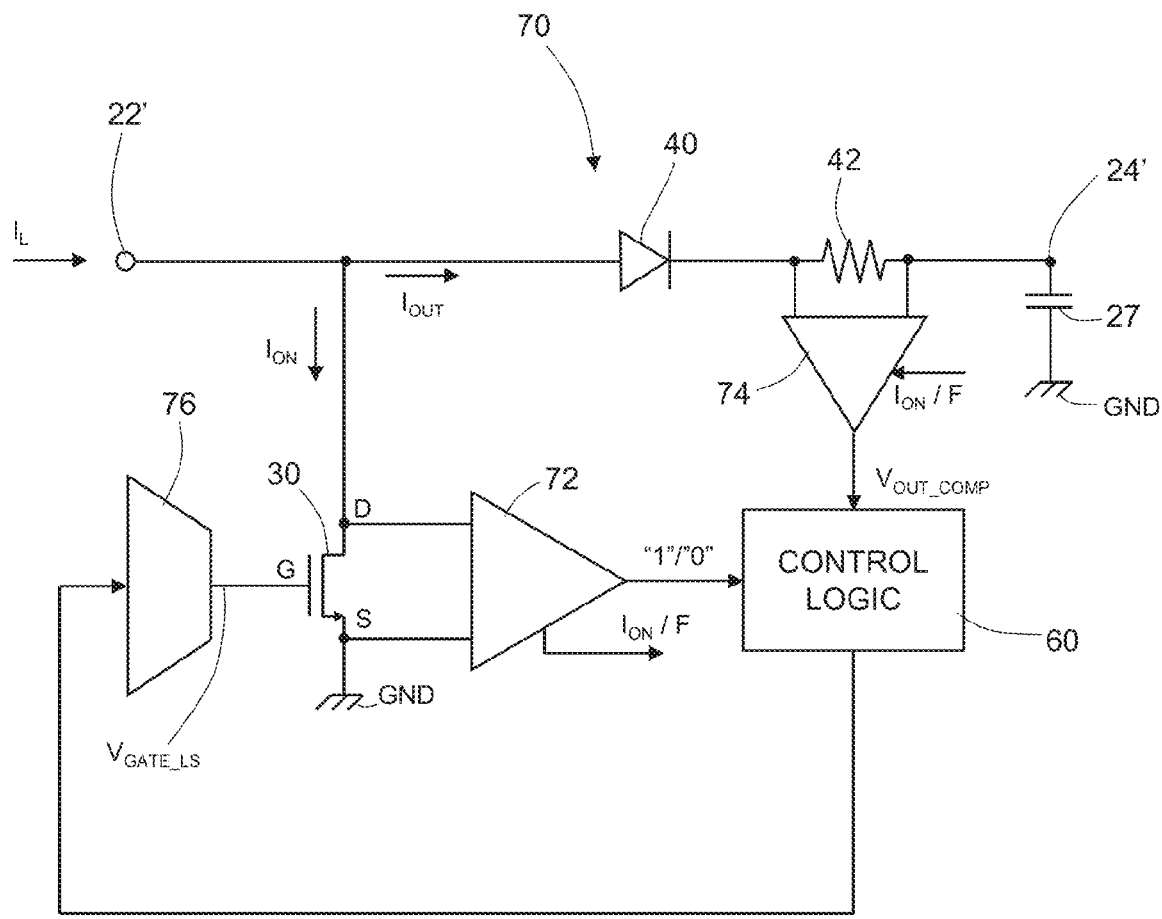
FIG. 8 shows a circuit for management and control of the scavenging-interface circuit of FIGS. 3a, 3b that can be used for positive half-waves of the signal at input to the scavenging-interface circuit.

FIG. 8 shows, by means of functional blocks, a control circuit 70 for control of the first transistor 30, which can be applied, in a similar way, for control of the second transistor 31. The control circuit 70 is designed for driving the first transistor 30 (and the second transistor 31) in order to implement the operating conditions of FIGS. 4a and 4b. The control circuit 70 operates, in particular, for positive half-waves of the input signal $V_{IN}$. In order to drive the second transistor 31 for negative half-waves of the input signal $V_{IN}$, a circuit architecture similar to the one shown for the control circuit 70 is used.

The control circuit 70 is configured for driving into an on/off state the first transistor 30 and to carry out sensing of the current that flows in the branch of the first transfer diode 40, in particular through the resistor 42. A circuit similar to the control circuit 70 (not shown) is used for driving into an on/off state the second transistor 31 and for carrying out sensing of the current that flows in the branch of the second transfer diode 41, in particular through the resistor 43 (having resistance $R_2$).

In greater detail, the control circuit 70 comprises a first current detector 72, coupled between the source terminal S and the drain terminal D of the first transistor 30, for detecting (during the step of FIG. 4a) when the current $I_{ON}$ that flows through the first transistor 30 exceeds the threshold $I_{TH}$.

Figure 9:
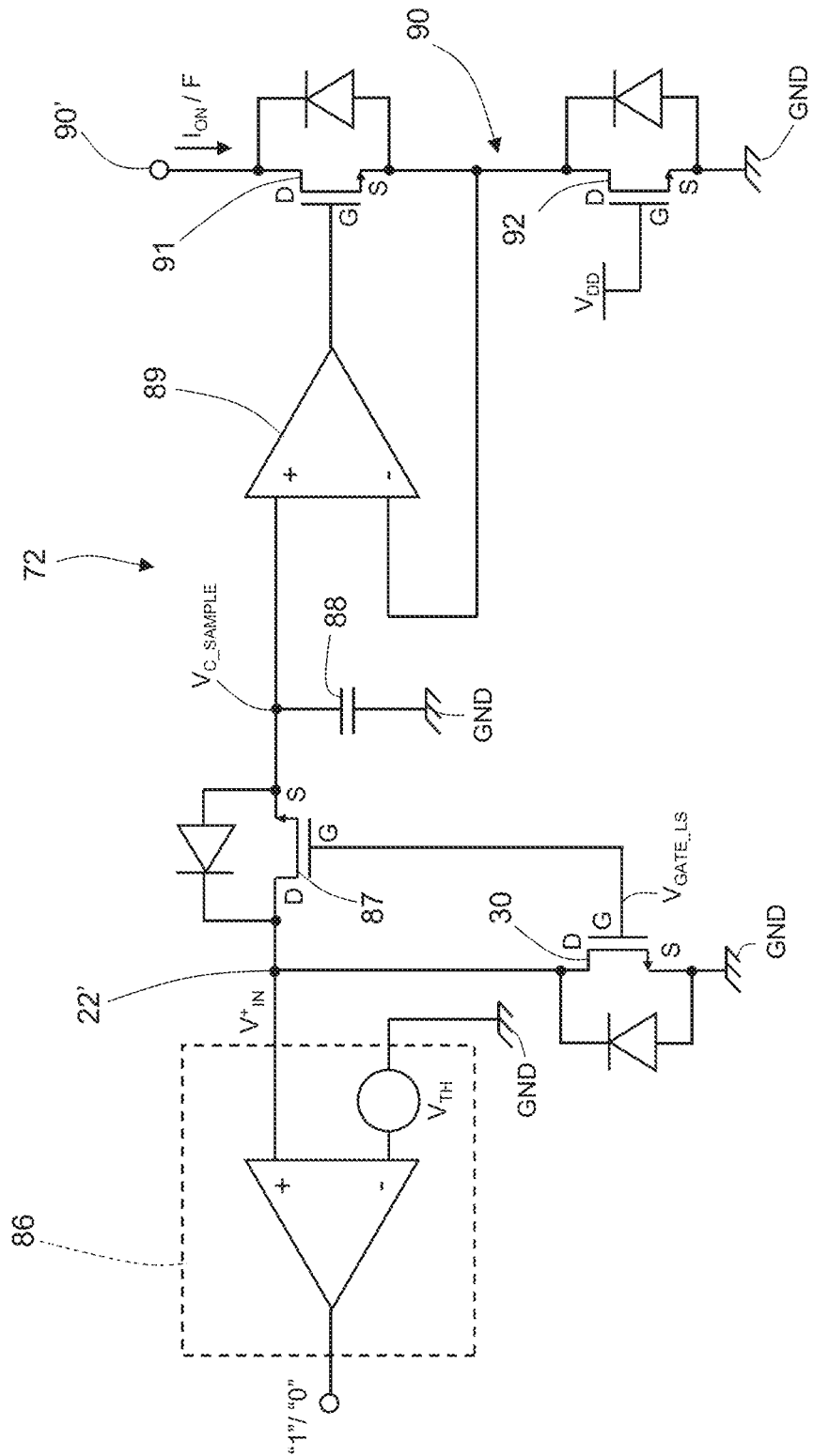
FIG. 9 shows, in greater detail, a portion of the management and control circuit of FIG. 8.

FIG. 9 shows in greater detail the first current detector 72, according to one embodiment. With reference to said FIG. 9, a first portion of the current detector 72 comprises a comparator 86 configured for receiving at input the voltage signal $V_{IN}$ and a threshold signal $V_{TH}$, to generate at output a digital signal that assumes the low logic level "0" when $V_{IN}<V_{TH}$ (i.e., $I_{ON}<I_{TH}$) and the high logic level "1" when $V_{IN}>V_{TH}$ (i.e., $I_{ON}\geq I_{TH}$), or vice versa.

The signal at output from the comparator 86 corresponds to the output of the current detector 72 in FIG. 8, and is supplied to the control logic 60. On the basis of said signal, once the time interval $T_{DELAY}$ has elapsed, the control logic 60 opens the first transistor 30. Passage of the time interval $T_{DELAY}$ may be, indifferently, monitored by the control logic 60 or by the current detector 72 itself. In the latter case, the signal at output from the comparator 86 assumes a high logic level "1" when $I_{ON}\geq I_{TH}$ and $t\geq T_{DELAY}$, and the control logic 60 opens the first transistor 30 at the rising edge of the digital signal generated by the comparator 86.

Once again with reference to FIG. 9, a second portion of the current detector 72 comprises a negative-feedback loop (described more fully hereinafter) configured for generating a current signal proportional to the current $I_{ON}$ that flows through the first transistor 30 and, in particular, equal to a fraction 1/F of the current $I_{ON}$.

To return to FIG. 8, the control circuit 70 further comprises a second current detector 74, coupled across the resistor 42. The second current detector 74 is similar to the first current detector 72 and is configured for detecting the value of current that flows through the resistor 42 (and, in particular, through the first transfer diode 40), during the operating step of FIG. 4b. In particular, the second current detector 74 co-operates with the control logic 60 in order to detect whether the current $I_{OUT}$ reaches the minimum expected value $I_{OFF}=I_p/K$. The output signal of the second current detector 74, indicating the current value $I_{OUT}$, is supplied at input to the control logic 60.

The second current detector 74 receives at input the current $I_{ON}/F$ (generated by the first current detector 72, as has been described previously), and switches when the current measured through the resistor 42 reaches the minimum expected value given by $I_{OFF}=I_P/K$.

In particular, the following relations apply:

$$I_{OFF} = \frac{I_P}{K}$$

$$K = \frac{F}{G}$$

$$G = \frac{R_{DMY}}{R_1}$$

where G is a gain factor, and $R_{DMY}$ is the electrical resistance of the resistor 97 shown and described hereinafter with reference to FIG. 11. Flowing through the resistor 97 is the current $I_{ON}/F$ generated by the first current detector 72.

The control circuit 70 further comprises a driving device 76 coupled between the control logic 60 and the control terminal G of the first transistor 30. The driving device 76 is, in itself, of a known type, and is configured to drive into an open/closed state the first transistor 30 on the basis of a control signal received from the control logic 60. In particular, in the operating condition of FIG. 4*a*, the control logic 60 drives, via the driving device 76, the first transistor 30 into the closed state. When, on the basis of the signal generated at output from the first current detector 72, the control logic 60 detects that the current $I_L = I_{ON}$ has reached (and/or exceeded) the threshold value $I_{TH}$, and the time $T_{DELAY}$ has elapsed, the control logic 60 drives, via the first driving device 76, the first transistor 30 into an open state. In this condition, the current $I_{OUT}$ can flow from the inductor 22*b* to the capacitor 27.

Then, the control logic 60 monitors, on the basis of the signal received from the second current detector 74, the value of the current $I_{OUT}$ for governing passage from the current operating condition (of supply of the load, FIG. 4*b*) to the operating condition of storage of energy in the inductor 22*b* (FIG. 4*a*), as soon as the current $I_{OUT}$ reaches the value $I_{OFF}$.

What has been described herein, both from a circuit standpoint and as regards the method for operating the control circuit 70, can be applied, in a corresponding way evident for the person skilled in the sector, to the second transistor 31, which is controlled in a way similar to what has been described previously for rectification of negative half-waves of the voltage $V_{TRANSD}$.

With reference to FIG. 9, the first current detector comprises, as has been said, the comparator 86. The latter, in co-operation with the control logic 60, detects whether the current $I_L = I_{ON}$ reaches (or exceeds) the threshold value $I_{TH}$ set. The comparator 86 is configured for receiving, at input to the non-inverting terminal, the voltage signal present on the input terminal 22' of the rectifier circuit 24 (signal $V_{IN}^+$), and, at input to the inverting terminal, the threshold-voltage signal $V_{TH}$ in such a way that $V_{TH} = I_{TH} \cdot R_{ON}$. The value of resistance $R_{ON}$ is the value of on-state resistance of the first transistor 30. When the voltage $V_{IN}$ exceeds the threshold $V_{TH}$, the output of the comparator 86 changes state, signaling the fact that the threshold has been exceeded (and hence indicating that $I_L = I_{ON} \geq I_{TH}$).

The first current detector 72 further comprises a transistor 87 and a capacitor 88. The transistor 87 is connected between the first input terminal 22' of the rectifier circuit 24 and a terminal of the capacitor 88. The other terminal of the capacitor 88 is connected to the reference-voltage terminal GND. The control terminal G of the transistor 87 is connected to the control terminal G of the first transistor 30. In this way, the first transistor 30 and the transistor 87 are driven into an open/closed state by the same signal $V_{GATE\_LS}$ (generated, as has been described previously, by the driving device 76).

During the time interval $T_{DELAY}$ (situation of FIG. 4*a*), the first transistor 30 is closed. In this condition, the signal $V_{GATE\_LS}$ has a high value for driving the first transistor 30 into the closed state. Likewise, also the transistor 87 is closed. The capacitor 88 is consequently charged at the voltage present on the first input terminal 22' of the rectifier circuit 24.

The first current detector 72 moreover comprises a further comparator 89 and a branch 90 including a transistor 91 and a transistor 92 connected in series together between a terminal 90' and the reference-voltage terminal GND. In particular, the transistor 92 has its own control terminal G connected to a high-voltage supply terminal $V_{DD}$.

The comparator 89 receives at input to the non-inverting terminal the signal $V_{IN}^+$ present on the first input terminal 22' of the rectifier circuit 24, and at input to the inverting terminal the signal present on the drain terminal of the transistor 92 and drives the control terminal G of the transistor 91. The negative feedback ensures that the signal at input to the non-inverting terminal of the comparator 89 and the signal at input to the inverting terminal of the comparator 89 are the same so that the first transistor 30 and the transistor 92 have the same source-to-drain and source-to-gate voltages. The current that flows through the transistor 92 consequently reaches the peak value (scaled by a factor F with respect to the corresponding peak value of $I_{ON}$) at the end of the time interval $T_{DELAY}$. When the first transistor 30 is open, also the transistor 87 is open, and the capacitor 88 is in the floating state, thus ensuring a current $I_{ON}/F$ through the transistor 92 of a practically constant value equal to the scaled peak value $I_P/F$ during the time interval $T_{CHARGE}$ (see FIG. 10*a*).

The scale factor F is obtained by sizing appropriately the transistors 30 and 92, in such a way that the transistor 92 will have dimensions F times smaller than the transistor 30 and will be able to conduct a current F times lower than $I_{ON}$.

FIGS. 10*a* and 10*b* are graphic illustrations of the time plots of the signal $V_{IN}^+$, of the voltage signal $V_{C\_SAMPLE}$ across the capacitor 88, and of the signal $V_{GATE\_LS}$ applied to the control terminals G of the first transistor 30 and of the transistor 87.

At the end of $T_{CHARGE}$ the voltage $V_{C\_SAMPLE}$ drops to the value $I_{OFF} \cdot R_{ON}$, where $R_{ON}$ is the on-state resistance of the first transistor 30.

FIG. 10*a* shows, superimposed on one another, the signal $V_{IN}^+$ (dashed line) and $V_{C\_SAMPLE}$ (solid line). The two signals coincide completely during the storage step of FIG. 4*a*.

Figure 11:
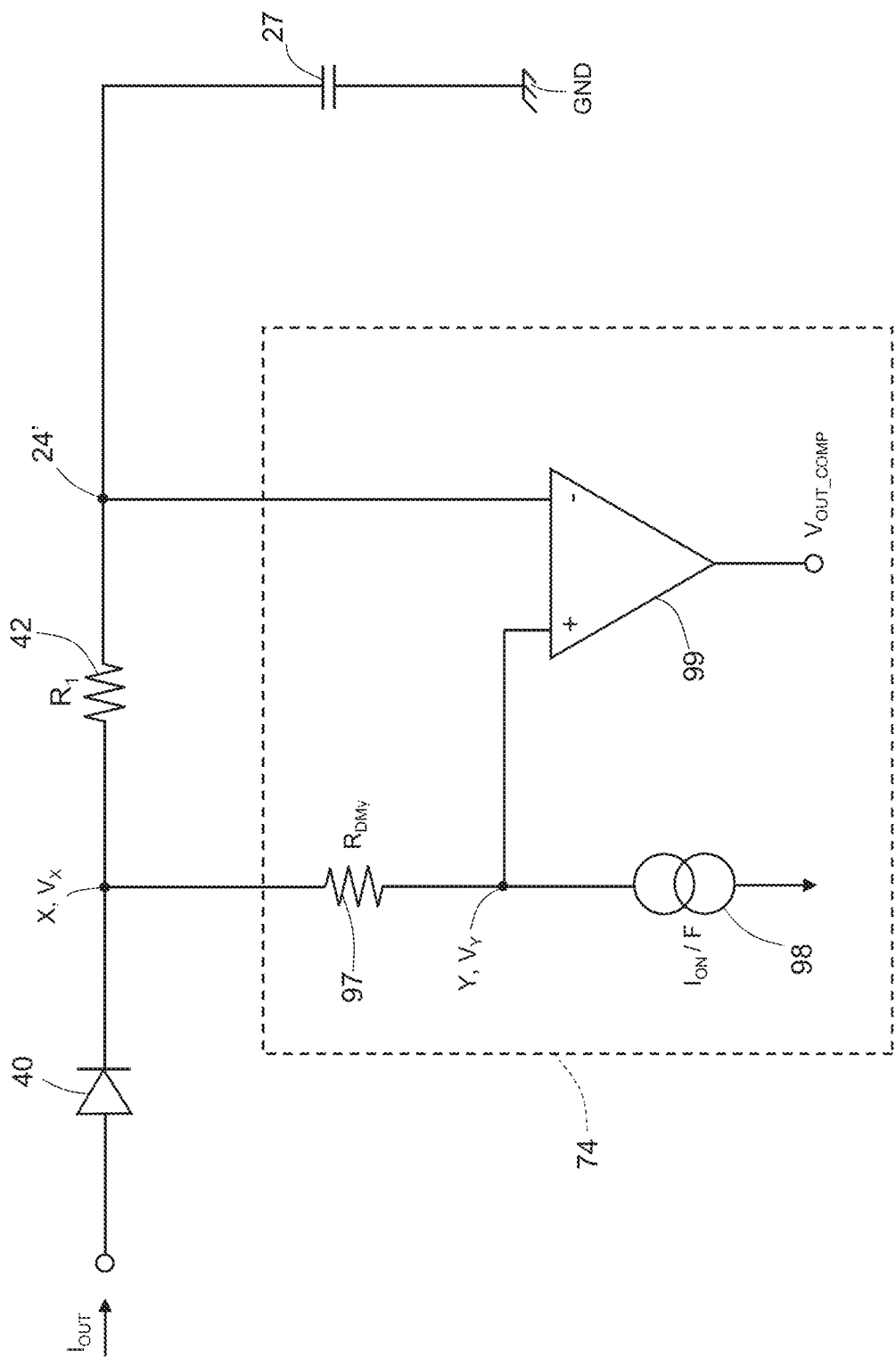
FIG. 11 shows, in greater detail, a further portion of the management and control circuit of FIG. 8.

FIG. 11 shows, in greater detail, the second current detector 74. The second current detector 74 of FIG. 11 comprises a resistor 97 and a comparator 99. The resistor 97 has a first conduction terminal connected between the cathode of the first transfer diode 40 and the resistor 42 (i.e., to the node X of the circuit of FIG. 11), and a second conduction terminal connected to a non-inverting input of the comparator 99 (node Y of the circuit of FIG. 11). The resistor 97 has an electrical resistance $R_{DMY}$ that is G times greater than resistance $R_1$ of the resistor 42 ($R_{DMY} = G \cdot R_1$) and flowing through it is the current $I_{ON}/F$ generated by the first current detector 72. Said situation is schematically represented in FIG. 11 by means of a current generator 98 connected to the node Y.

As has been said, the comparator 99 has its non-inverting terminal connected to the node Y, and its inverting terminal connected to the output terminal 24'. The output $V_{OUT\_COMP}$ of the comparator 99 is of a binary type, and assumes a first logic value when $V_{OUT} > V_Y$, and a second logic value when $V_{OUT} \leq V_Y$). In this way, the output $V_{OUT\_COMP}$ of the comparator 99 is also the output of the second current detector 74 that is supplied to the control logic 60. The control logic 60 can thus know, on the basis of the logic value of $V_{OUT\_COMP}$, the value of the output voltage signal $V_{OUT}$ with respect to the voltage signal $V_Y$ at each instant in time.

According to the circuit representation of FIG. 11, on the node X an intermediate voltage signal $V_X$ is present given by $$V_X = V_{OUT} + I_{OUT} R$$

and on the node Y an intermediate voltage signal $V_Y$ is present given by $$V_Y = V_X - G \cdot R \cdot (I_{ON}/F).$$

It follows that $$V_Y = V_{OUT} + I_{OUT} R - G \cdot (I_{ON}/F)$$

The condition of FIG. 5c, where the output current $I_{OUT}$ reaches the threshold $I_{OFF}$ is hence given by $G \cdot (I_{ON}/F)$, where $I_{ON} = I_P$ at time $t_c$ of FIG. 5. It moreover follows that the value of the constant K is given by F/G.

Figure 12A:
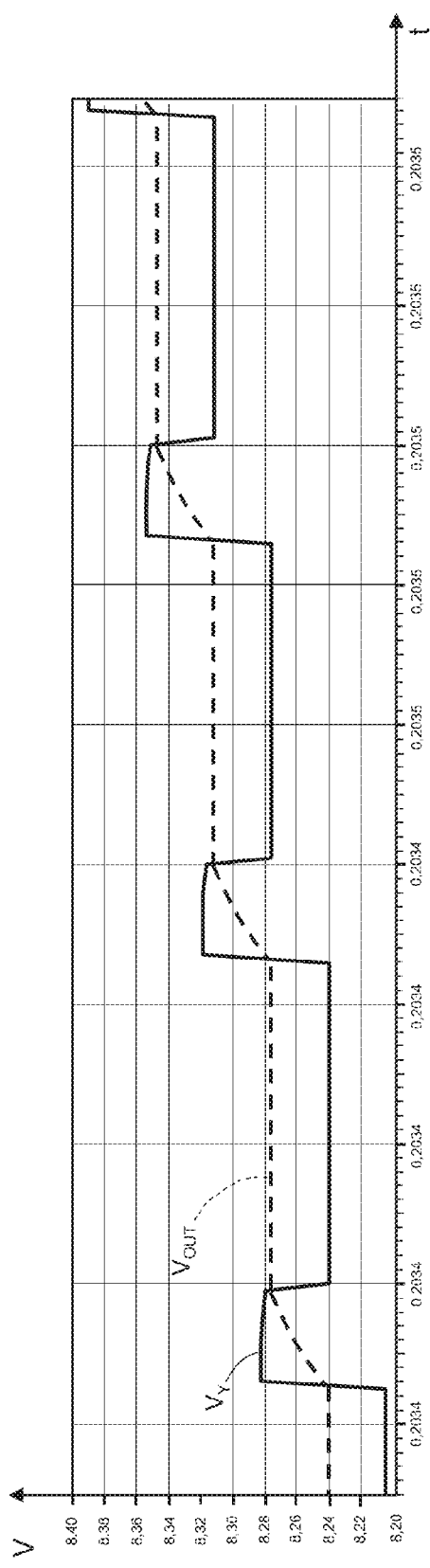
FIGS. 12a and 12b show, using one and the same time scale, the plot of electrical signals of the circuit of FIG. 11.
Figure 12B:
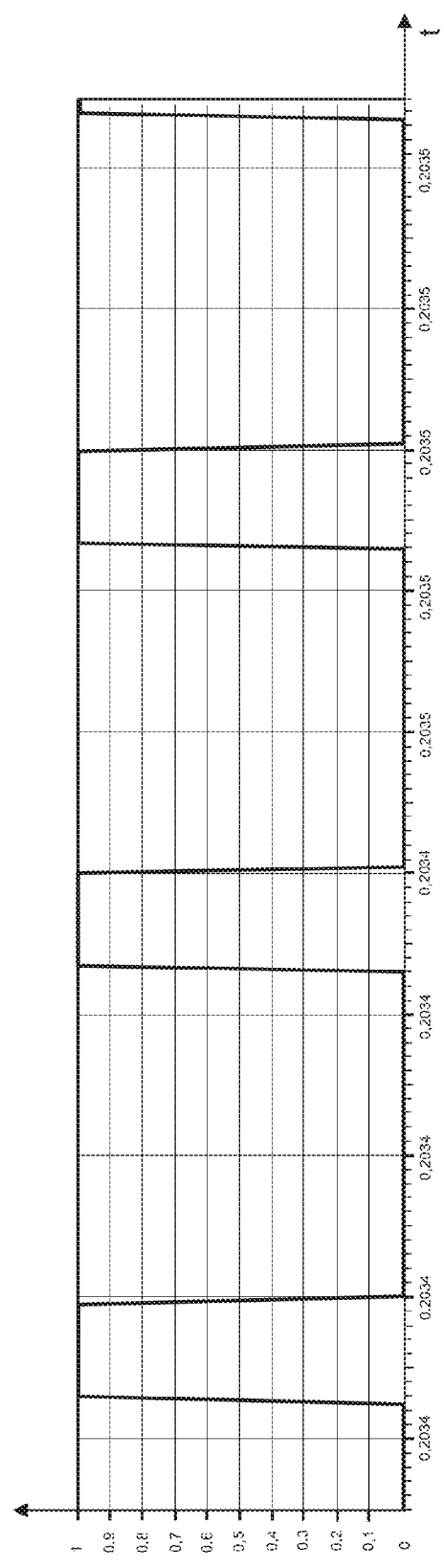

FIGS. 12a, 12b show, using one and the same time scale: the plot of the signals $V_Y$ and $V_{OUT}$ (FIG. 12a); and the plot of the signal $V_{OUT\_COMP}$ generated at output from the comparator 99 (FIG. 12b).

With reference to FIGS. 12a and 12b, it may be noted that the output of the comparator triggers to the high value at start of the step of FIG. 4b, i.e., when the control logic 60 governs opening of the transistor 30. As may be noted, the signal $V_{OUT}$ rises in time, as a confirmation of the fact that energy is stored on the output capacitor 27.

During the step of FIG. 4b (transfer of energy at output through the diode 40) the output voltage $V_{OUT}$ increases, while the output current $I_{OUT}$ decreases. When the voltage $V_{OUT}$ becomes equal to the voltage $V_Y$, the output $V_{OUT\_COMP}$ of the comparator 99 assumes a low value, and the control logic 60 governs closing of the switch 30.

What has been described previously applies, in an altogether equivalent way, for control of the second transistor 31 for negative polarities of the input voltage $V_{IN}$.

Figure 13:
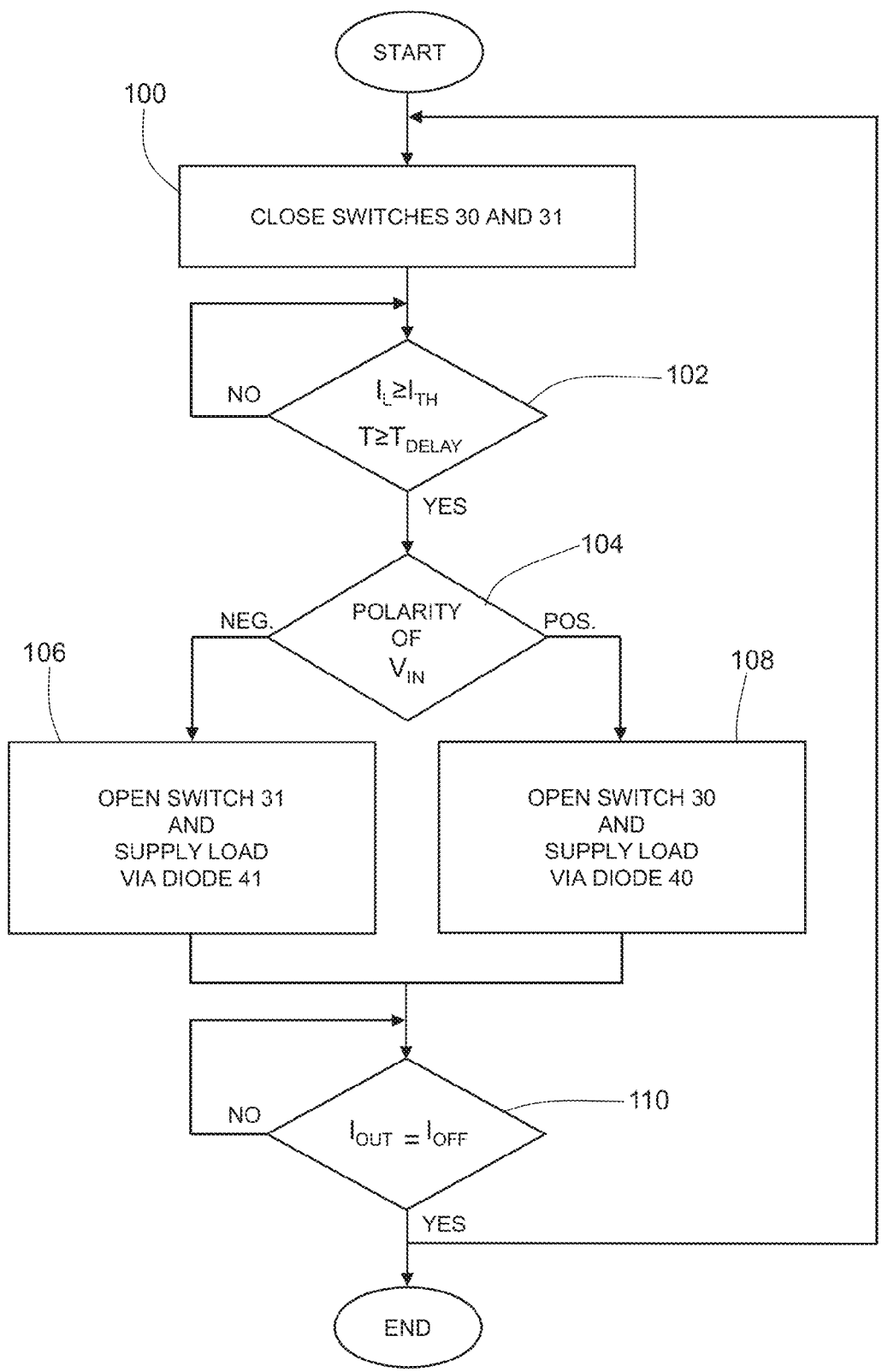
FIG. 13 shows, using a flowchart, steps of a control method of the energy-scavenging system of FIG. 3a or FIG. 3b.

The control logic 60 implements the method for control of the first transistor 30 and of the second transistor 31 schematically illustrated in FIG. 13, by means of a flowchart.

With reference to FIG. 13 (step 100), the first and second transistors 30 and 31 are closed (i.e., they are driven in conduction). In this way, the inductor 22b is charged via the current $I_L = I_{ON}$ that flows through the first and second transistors 30, 31.

The current value $I_L = I_{ON}$ is monitored (step 102) for detecting whether it reaches (or exceeds) the pre-defined threshold value $I_{TH}$. At the same time, the control logic 60 monitors the time interval $T_{DELAY}$. In this case, the time $t_0$ of start of the time interval $T_{DELAY}$ corresponds to the instant of closing of the first and second transistors 30, 31, according to step 100.

In the case where the current $I_L$ has not reached the threshold $I_{TH}$ or the time $T_{DELAY}$ has not elapsed (output NO from step 102), it is necessary to wait for both of these conditions to be met, and the control logic 60 keeps the system 20 in the wait state 102 until both of the conditions $T \geq T_{DELAY}$ and $I_L \geq I_{TH}$ are satisfied. Otherwise (output YES from step 102), flow passes to the next step 104. It is here pointed out that, once the time $T_{DELAY}$ has elapsed, if the current $I_L$ has not yet reached the threshold $I_{TH}$, the transistors 30 and 31 are kept closed until $I_L = I_{TH}$. All the advantages mentioned are in any case guaranteed.

During step 104 a check is made to verify whether the input voltage $V_{IN}$ has a positive polarity or a negative polarity. This check is carried out using comparators, connected, respectively, to the first input terminal 22' and to the second input terminal 22" of the rectifier 24, to receive the positive half-wave $V_{IN}^+$ and, respectively, the negative half-wave $V_{IN}^-$ of the input voltage $V_{IN}$. The respective comparator compares the signal $V_{IN}^+$ and, respectively, $V_{IN}^-$ with a positive-half-wave reference value and, respectively, a negative-half-wave reference value.

The operation of comparison of step 104 can be carried out by means of purposely provided comparators or exploiting the comparator 86 (FIG. 9), which receives at input the signal $V_{IN}^+$, and a similar comparator, which receives at input the signal $V_{IN}^-$ (the latter not shown in the figures). In fact, as has already been said, a circuit equivalent to the one shown in FIG. 9 is coupled to the second switch 31, and can thus be used in a similar way to verify whether the input voltage $V_{IN}$ has a negative polarity.

In the case where the input voltage $V_{IN}$ has a negative polarity, control passes to step 106 (output NEG from step 104), where the second switch 31 is opened to supply the capacitor 27/load 28 via the second transfer diode 41.

In the case where the input voltage $V_{IN}$ has a positive polarity, control passes, instead, to step 108 (output POS from step 104), where the first switch 30 is opened, for supplying the capacitor 27/load 28 via the diode 40.

Exit from steps 106 and 108 leads to step 110, where the control logic 60 monitors the value of current $I_{OUT}$ that flows through the first transfer diode 40 (or the diode 41 according to the polarity of the input voltage $V_{IN}$) towards the output of the rectifier 24 for detecting whether the current $I_{OUT}$ assumes a value equal to $T_{OFF}$. As long as $I_{OUT} > I_{OFF}$, the control logic 60 keeps the system 20 in the step of charging of the capacitor 27/supply of the load 28. When $I_{OUT} = I_{OFF}$, control returns to step 100. The steps 100-104 are executed, as described with reference to FIGS. 5a-5c, in a time interval at least equal to $T_{DELAY}$, whereas the steps 106-110 are executed within the time interval $T_{CHARGE}$.

The control logic 60 is, for example, a microcontroller of an integrated or non-integrated type, configured for driving the first and second transistors 30, 31 in order to carry out the steps of the method of FIG. 13.

Figure 14:
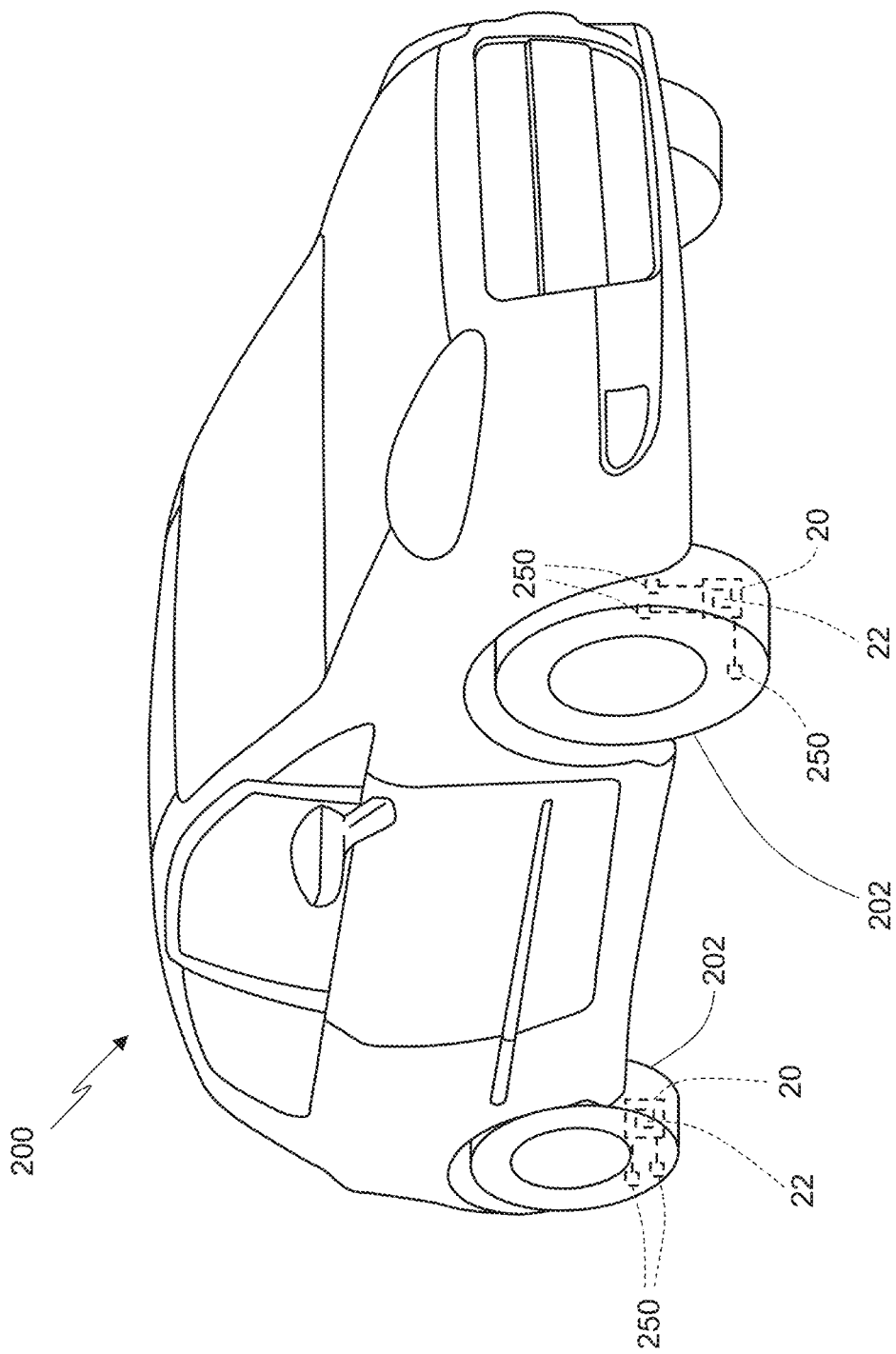
FIG. 14 shows a vehicle comprising the energy-scavenging system of FIG. 3a or FIG. 3b.

FIG. 14 shows a vehicle 200 comprising the energy-scavenging system 20 of FIG. 3a or, more in particular, FIG. 3b. The vehicle 200 is, for example, a motor vehicle. It is evident, however, that the energy-scavenging system 20 can be used in any vehicle 200 or in systems or apparatuses different from a vehicle. In particular, the energy-scavenging system 20 can find application in generic systems in which it is desirable to harvest, store, and use environmental energy, in particular by means of conversion of mechanical energy into electrical energy.

With reference to FIG. 14, the vehicle 200 comprises one or more transducers 22 coupled in a known way to a portion of the vehicle 200 subject to mechanical stresses and/or vibrations, for converting said mechanical stresses and/or vibrations into electric current.

The energy-scavenging system 20 is connected to one or more electrical loads 28a, . . . 28n, for example via interposition of a DC-DC converter. In particular, according to an application of the present invention, the electrical loads 28a, . . . 28n comprise TPM (tyre-parameter monitoring) sensors 250 for monitoring parameters of tyres 202. In this case, the TPM sensors 250 are coupled to an internal portion of the tyres 202 of the vehicle 200. Likewise, also the transducers 22 (for example, of an electromagnetic or piezoelectric type) are coupled to an internal portion of the tyres 202.

The stress of the transducers 22 when the vehicle 200 is travelling causes production of an electric current/voltage signal at output from the transducer 22 by means of conversion of the mechanical energy into electrical energy. The electrical energy thus produced is stored, as has been described previously, in the storage element 27 and supplied, via the DC-DC converter that may be present, to the TPM sensors 250.

According to one embodiment of the present invention, the energy-scavenging system 20, comprising one or more transducers, and the TPM sensors 250, are glued inside one or more tires 202. Impact of the tires 202 on the ground during motion of the vehicle 200 enables production of electrical energy.

As an alternative to what is shown in FIG. 14, the energy-scavenging system 20 can be arranged in any other portion of the vehicle 200, and/or used for supplying an electrical load other than or additional to the TPM sensors 250.

Figure 15:
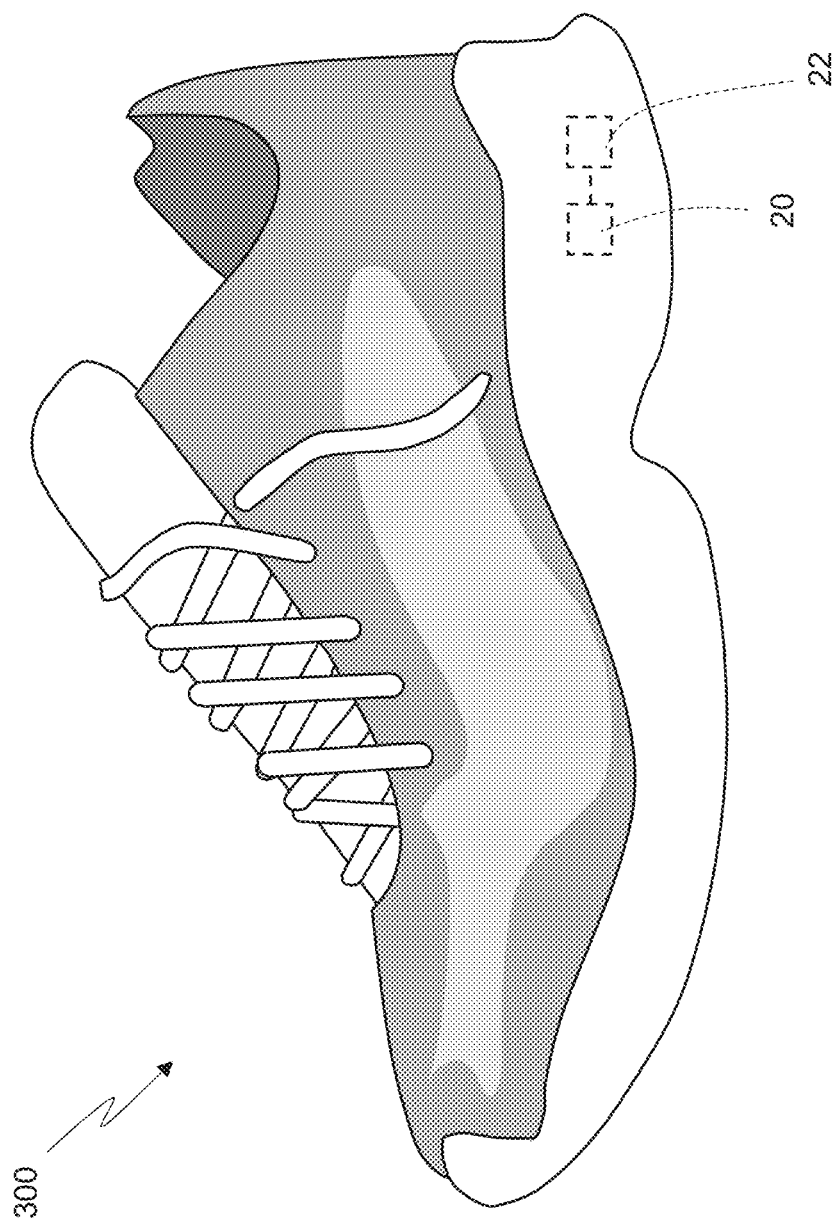
FIG. 15 shows an item of sports footwear comprising the energy-scavenging system of FIG. 3a or FIG. 3b.

Another possible application of the energy-scavenging system 20 is the generation of electrical energy by exploiting the mechanical energy produced by a person when he is walking or running. In this case, the energy-scavenging system 20 is set inside the shoes 300 of said person (for example, inside the sole) as shown schematically in FIG. 15. In systems aimed at fitness, where it is of particular interest to count the steps, it is useful to recover energy from the vibrations induced by walking/running in order to be able to supply without using batteries acceleration sensors and/or RFID transmitters that are able to communicate with cellphones, music-player devices, or any other apparatus that might require information on the steps made.

From an examination of the characteristics of the invention provided according to the present disclosure the advantages that it affords are evident.

In particular, since the duration of the time interval $T_{DELAY}$ is (typically) constant, the rectifier 24 operates at constant duty cycle of the signal of opening/closing of the first and second switches 30, 31. This enables values of efficiency $\eta_{SCAV}$ (efficiency of the rectifier 24, having the function of scavenging interface of the system 20) to be obtained that are particularly high (the present applicant has found efficiency values higher than 85% irrespective of the values assumed by $V_{TRANSD}$ and $V_{OUT}$).

The scavenging efficiency is moreover high even when the amplitude of the signal $V_{TRANSD}$ of the transducer 22 is lower than the voltage value stored in the capacitor 27, overcoming a limitation of the diode-bridge rectifier architecture.

Moreover, since in the case of a transducer 22 of an electromagnetic type the rectifier 24 exploits the inductor 22b inside the transducer 22, the scavenging efficiency is high even when the amplitude of the signal of the transducer is low.

Using an HV (high-voltage) technology for the capacitor 27 and for the scavenging interface it is possible to store high voltages, and hence a high energy, in the capacitor, increasing the autonomy of operation of the TPM sensors 250 accordingly.

The method described, which envisages the choice of an optimal value of $T_{DELAY}$ and of K, enables implementation of an active control (of the mean value and of the ripple) of the current supplied by the transducer, and enables an optimal matching of impedance between the transducer 22 and the scavenging interface 24. This ensures an efficiency $\eta_{SCAV}$ of the scavenging interface 24b that is high irrespective of the velocity of rotation of the tires 202 and of the conditions of storage of energy in the capacitor 27. In fact, the present applicant has verified that in the applications of interest, the value of $\eta_{SCAV}$ can be kept between 75% and 87.5%, even when the power at output from the transducer is equal to or lower than 100 μW. The energy-scavenging interface according to the present invention is consequently suited to low-power applications.

The presence of the diodes 40 and 41 on the output branch enables increase in the robustness of the scavenging interface according to the present invention; in fact, this enables elimination of reverse current flow from the capacitor 27 to the transducer.

The rectifier 24 moreover finds use in systems other than the energy-scavenging system 20, i.e., ones based upon electromagnetic transducers of any type.

In addition, the rectifier circuit 24 may be used with transducers of another type, by interposition of an appropriate circuit between the transducer and the rectifier circuit configured to provide a storage of energy similar to the inductor 22b.

The rectifier 24 and, in general, the energy-scavenging system 20 are of a fully integrated type, and consequently require minimum space of installation.

Finally, it is clear that modifications and variations may be made to what has been described and illustrated herein, without thereby departing from the sphere of protection of the present invention, as defined in the annexed claims.

In particular, according to an embodiment of the present invention, the rectifier circuit 24 can comprise a number of transistors different from the one described. For example, the rectifier circuit 24 can be a half-wave rectifier, comprising only the first transistor 30 and the diode 40, or else only the second transistor 31 and the diode 41. The use of a half-wave rectifier may be advantageous in the case where the input signal $V_{IN}$ is of a known type and comprises only or above all half-waves which have just one polarity (positive or negative).

In addition, the conditions $t > T_{DELAY}$ and $I_L > I_{TH}$ expressed with reference to the operating condition of FIG. 4a are not both necessary. In particular, for voltage signals generated by transducers 22 of a known type the voltage value always reaches peaks such as to enable the threshold $I_{TH}$ to be exceeded within the time $T_{DELAY}$. Moreover, an appropriate choice of $T_{DELAY}$ always guarantees, for practical purposes, that an acceptable minimum threshold $I_{TH}$ is reached.

Furthermore, there may be present a plurality of transducers 22, all of the same type or of types different from one another, indifferently. For example, the transducer/transducers may be chosen in the group comprising: electrochemical transducers (configured to convert chemical energy into an electrical signal), electromechanical transducers (configured to convert mechanical energy into an electrical signal), electroacoustic transducers (configured to convert pressure variations into an electrical signal), electromagnetic transducers (configured to convert a magnetic field into an electrical signal), photoelectric transducers (configured to convert light energy into an electrical signal), electrostatic transducers, thermoelectric transducers, piezoelectric transducers, thermoacoustic transducers, thermomagnetic transducers, thermoionic transducers.

What is claimed is:

1. An energy-scavenging interface, comprising:
   a first input terminal couplable to an inductive storage element;
   a second input terminal;
   a first output terminal couplable to load;
   a second output terminal;
   a first switch coupled between the first input terminal and the second output terminal;
   a first diode coupled between the first input terminal and the first output terminal; and a control circuit configured to:
control the first switch in a closed state for a first time interval to pass a first electric current through the inductive storage element;
determine when both the first time interval has elapsed and the first electric current exceeds a first threshold value;
sense a first peak value of the first electric current passing through the inductive storage element at an end of the first time interval;
generate a scaled value of the sensed first peak value as a second threshold value;
after said determination, control the first switch in an open state so as to supply the load through the first diode with an output current from the inductive storage element;
sense a value of the output current; and
keep the first switch in the open state as long as the value of the sensed output current is higher than the second threshold value.

2. The energy-scavenging interface according to claim 1, further comprising:
a second switch coupled between the second input terminal and the second output terminal; and
a second diode coupled between the second input terminal and the first output terminal; and
wherein said control circuit is further configured to:
control the second switch in a closed state for a second time interval to pass a second electric current through the inductive storage element;
determine when both the second time interval has elapsed and the second electric current exceeds a third threshold value;
sense a second peak value of the second electric current passing through the inductive storage element at an end of the second time interval;
generate a scaled value of the sensed second peak value as a fourth threshold value;
after said determination, control the second switch in an open state so as to supply the load through the second diode with the output current from the inductive storage element; and
keep the second switch in the open state as long as the value of the sensed output current is higher than the fourth threshold value.

3. The energy-scavenging interface according to claim 2, wherein a duration of either the first or second time interval and a scale factor for the scaled value are chosen so as to optimize an impedance matching efficiency at the first and second input terminals.

4. The energy-scavenging interface according to claim 3, wherein a duration of the first time interval is between approximately 1 μs and 100 μs.

5. The energy-scavenging interface according to claim 3, wherein the scale factor is greater than 1.

6. The energy-scavenging interface according to claim 3, wherein the control circuit is further configured to:
define said impedance matching efficiency as a function of the duration of the first time interval and of the scale factor;
acquire a plurality of values of impedance matching efficiency associated to a plurality of values of said duration of the first time interval and to a respective plurality of values of the scale factor; and
identify a value of said duration of the first time interval and a value of the scale factor so as to optimize the impedance matching efficiency.

7. The energy-scavenging interface according to claim 2, further comprising a third electrical-signal detecting device coupled to opposite conduction terminals of the second switch and configured to detect, during the second time interval, whether the second electric current in the inductive storage element reaches the second threshold value.

8. The energy-scavenging interface according to claim 7, wherein the second electrical-signal detecting device comprises:
a capacitor connectable between the second input terminal and the second output terminal and configured to acquire and store an electrical signal indicating said second peak value; and
a second current-scaling switch controlled in an open and closed state together with the second switch and configured to carry an electric current having a current value equal to a first fraction of the second peak value.

9. The energy-scavenging interface according to claim 8, further comprising a fourth electrical-signal detecting device coupled to the second input terminal and to the first output terminal and configured to acquire the value of the output current that flows through the second diode and detect when the value of the output current assumes a value equal to said current value, said fourth electrical-signal detecting device comprising a comparator.

10. The energy-scavenging interface according to claim 1, further comprising a first electrical-signal detecting device coupled to opposite conduction terminals of the first switch and configured to detect, during the first time interval, whether the first electric current in the inductive storage element reaches the first threshold value.

11. The energy-scavenging interface according to claim 10, wherein the first electrical-signal detecting device comprises:
a capacitor connectable between the first input terminal and the second output terminal configured to acquire and store an electrical signal indicating said first peak value; and
a first current-scaling switch controlled in an open and closed state together with the first switch and configured to carry an electric current having a current value equal to a first fraction of the first peak value.

12. The energy-scavenging interface according to claim 10, further comprising a second electrical-signal detecting device coupled to the first input terminal and to the first output terminal and configured to acquire the value of the output current and detect when the value of the output current assumes a value equal to said current value, said second electrical-signal detecting device comprising a comparator.

13. The energy-scavenging interface according to claim 1, wherein the first and second input terminals are connectable to a transducer of an electromagnetic type including said inductive storage element.

14. A method for scavenging energy, comprising:
passing a first electric current of an electrical input signal through an inductive storage element for a duration of a first time interval;
determining when both the first time interval has elapsed and the first electric current passing through the inductive storage element reaches a first threshold value;
sensing a first peak value of the first electric current passing through the inductive storage element during the first time interval;
generating a scaled value of the sensed first peak value as a second threshold value;
after said determination, supplying to an electrical load an output current from the inductive storage element;

sensing a value of the output current; and
continuing to supply said output current for so long as the value of the sensed output current is higher than the second threshold value.

15. The energy-scavenging method according to claim 14, further comprising:
acquiring the first peak value;
scaling said first peak value by a scale factor to obtain said scaled value; and
identifying the duration of the first time interval and the scale factor so that matching efficiency between the inductive storage element and an energy-scavenging interface is optimal.

16. The energy-scavenging method according to claim 15, wherein identifying comprises:
defining said matching efficiency as a function of the duration of the first time interval and of the scale factor; and
acquiring a plurality of values of matching efficiency associated to a respective plurality of values of said duration of the first time interval and to a respective plurality of values of the scale factor.

17. The energy-scavenging method according to claim 15, further comprising choosing said first time duration as a value comprised between approximately 1 μs and 100 μs.

18. The energy-scavenging method according to claim 15, further comprising choosing the first scale factor to have a value approximately greater than 1.

19. The energy-scavenging method according to claim 14, wherein:
passing comprises closing a switch connected between the inductive storage element and the reference node; and
supplying comprises opening the switch to supply the load through a diode.

20. The energy-scavenging method according to claim 14, wherein the electrical input signal has a first polarity and a second polarity of mutually opposite sign, the first electric current associated with the first polarity, further comprising when the electrical input signal has the second polarity:
passing a second electric current associated with the second polarity through the inductive storage element for a duration of a second time interval;
determining when both the second time interval has elapsed and the second electric current passing through the inductive storage element reaches a third threshold value;
sensing a second peak value of the second electric current passing through the inductive storage element at an end of the second time interval;
generating a scaled value of the sensed second peak value as a fourth threshold value;
after said determination, supplying to an electrical load an output current from the inductive storage element; and
continuing to supply said output current for so long as the value of the sensed output current is higher than the fourth threshold value.

21. The energy-scavenging method according to claim 14, wherein:
if the electrical input signal has the second polarity:
passing comprises closing a first switch connected between the inductive storage element and the reference node; and
supplying comprises opening the first switch to supply the load through a first diode; and
if the electrical input signal has the second polarity:
passing comprises closing a second switch connected between the inductive storage element and the reference node; and
supplying comprises opening the second switch to supply the load through a second diode.

22. An apparatus, comprising:
a first input terminal couplable to an inductive storage element;
a second input terminal;
a first output terminal couplable to load;
a second output terminal;
a first switch coupled between the first input terminal and the second output terminal;
a first diode coupled between the first input terminal and the first output terminal; and
a control circuit configured to control actuation of the first switch to selectively pass a first electric current through the inductive storage element, said control circuit comprising:
a first current sensing circuit configured to sense a first peak value of the first electric current passing through the inductive storage element;
a storage circuit configured to store a signal indicative of the sensed first peak current;
a current source circuit configured to generate from said signal a threshold current having a scaled value of the sensed first peak value;
a second current sensing circuit configured to sense a discharge current from the inductive storage element through said first diode; and
a comparison circuit configured to enable actuation of the first switch when the sensed discharge current is less than the threshold current.

23. The apparatus according to claim 22,
wherein the storage circuit comprises a capacitor connectable between the first input terminal and the second output terminal configured to acquire and store said signal indicative of the sensed first peak value; and
wherein the current source circuit comprises a current-scaling switch controlled in an open and closed state together with the first switch and configured to supply said threshold current having a second value equal to a first fraction of the first peak value.

24. The apparatus according to claim 22, wherein the comparison circuit comprises a comparator operating to compare the discharge current to the threshold current.

25. The apparatus according to claim 22, further comprising:
a second switch coupled between the second input terminal and the second output terminal; and
a second diode coupled between the second input terminal and the first output terminal; and
wherein said control circuit is further configured to control actuation of the second switch to selectively pass a second electric current through the inductive storage element and generate a threshold current having a scaled value of the second peak value, and comprises:
a third current sensing circuit configured to sense a discharge current from the inductive storage element through said second diode; and
a comparison circuit configured to enable actuation of the second switch when the sensed discharge current is less than the threshold current.

26. The apparatus of claim 22, further comprising:
a transducer configured to convert energy from an external source into a transduced electrical signal and including a first storage element;
an electrical-energy-scavenging interface configured to receive the transduced electrical signal and supply an output signal to the first and second input terminals.

27. The apparatus according to claim 26, wherein the transducer is of an electromagnetic type including said inductive storage element.

28. The apparatus according to claim 26, wherein electrical-energy-scavenging interface comprises a DC-DC converter.

29. The apparatus according to claim 26, wherein the transducer is installed in a vehicle and actuated by motion of said vehicle.

30. The apparatus according to claim 26, wherein the transducer installed in an item of sports footwear and actuated by motion of said item of sports footwear.

\* \* \* \* \*